US011815519B2

(12) United States Patent
Wissmann et al.

(10) Patent No.: US 11,815,519 B2
(45) Date of Patent: Nov. 14, 2023

(54) STRAY LIGHT COMPENSATING METHODS AND APPARATUS FOR CHARACTERIZING A SPECIMEN

(71) Applicant: Siemens Healthcare Diagnostics Inc., Tarrytown, NY (US)

(72) Inventors: Patrick Wissmann, Munich (DE); Benjamin S. Pollack, Jersey City, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 638 days.

(21) Appl. No.: 16/632,321

(22) PCT Filed: Jul. 16, 2018

(86) PCT No.: PCT/US2018/042341
§ 371 (c)(1),
(2) Date: Jan. 17, 2020

(87) PCT Pub. No.: WO2019/018313
PCT Pub. Date: Jan. 24, 2019

(65) Prior Publication Data
US 2020/0166531 A1 May 28, 2020

Related U.S. Application Data

(60) Provisional application No. 62/534,645, filed on Jul. 19, 2017.

(51) Int. Cl.
*G06T 7/12* (2017.01)
*G01N 35/00* (2006.01)
(Continued)

(52) U.S. Cl.
CPC ...... *G01N 35/00732* (2013.01); *G01J 1/0295* (2013.01); *G01N 35/00623* (2013.01);
(Continued)

(58) Field of Classification Search
CPC ......... G06T 7/0012; G06T 5/008; G06T 7/80; H01L 25/16; H01L 2924/0002;
(Continued)

(56) References Cited

U.S. PATENT DOCUMENTS 6,347,552 B1  2/2002  Purpura et al.
6,353,471 B1  3/2002  Samsoondar et al.
(Continued)

FOREIGN PATENT DOCUMENTS

CN     1146011 A    3/1997
CN   101598661 A   12/2009
(Continued)

OTHER PUBLICATIONS

PCT International Search Report and Written Opinion dated Oct. 3, 2018 (12 Pages).
(Continued)

*Primary Examiner* — Masum Billah

(57) ABSTRACT

A quality check module for characterizing a specimen and/or a specimen container including stray light compensation. The quality check module includes an imaging location within the quality check module configured to receive a specimen container containing a specimen, one or more image capture devices configured to capture images of the imaging location from one or more viewpoints, and one or more light sources configured to provide back lighting for the one or more image capture devices, and one or more stray light patches located in an area receiving stray light from the one or more light sources enabling stray light affecting the images to be compensated for and to provide a stray light compensated image. Calibration methods, methods of characterizing a specimen, specimen testing apparatus including a quality check module, and specimen con-
(Continued)

tainer carriers including one or more stray light patches are provided, as are other aspects.

20 Claims, 13 Drawing Sheets

(51) Int. Cl.
G01J 1/02 (2006.01)
G06T 7/00 (2017.01)
G06T 7/80 (2017.01)
G06V 10/143 (2022.01)
G06V 20/69 (2022.01)
G06V 10/60 (2022.01)

(52) U.S. Cl.
CPC ..... *G01N 35/00693* (2013.01); *G06T 7/0012* (2013.01); *G06T 7/80* (2017.01); *G06V 10/143* (2022.01); *G06V 20/698* (2022.01); *G06V 10/60* (2022.01)

(58) Field of Classification Search
CPC .. H01L 2924/00; G01J 1/0295; G06V 10/143; G06V 10/40; G06V 10/60
USPC ....................................................... 382/274
See application file for complete search history.

(56) References Cited

U.S. PATENT DOCUMENTS

| | | | |
|---|---|---|---|
| 6,461,036 B1 | 10/2002 | Shajii et al. | |
| 6,599,476 B1 | 7/2003 | Watson et al. | |
| 7,282,723 B2 | 10/2007 | Schomacker et al. | |
| 7,422,693 B2 | 9/2008 | Carter et al. | |
| 7,663,738 B2 | 2/2010 | Johansson | |
| 7,760,340 B2 | 7/2010 | Hoshiko et al. | |
| 7,771,659 B2 | 8/2010 | Ziegler | |
| 7,854,891 B2 | 12/2010 | Yamamoto et al. | |
| 7,982,201 B2 | 7/2011 | Bryant et al. | |
| 8,064,061 B2 | 11/2011 | Yamamoto et al. | |
| 8,194,235 B2 | 6/2012 | Kosaka et al. | |
| 8,380,444 B2 | 2/2013 | Kim et al. | |
| 8,381,581 B2 | 2/2013 | Walsh et al. | |
| 8,545,760 B2 | 10/2013 | Yamamoto et al. | |
| 8,859,289 B2 | 10/2014 | Marty et al. | |
| 9,322,761 B2 | 4/2016 | Miller | |
| 10,725,060 B2 | 7/2020 | Chang et al. | |
| 10,816,538 B2 | 10/2020 | Kluckner et al. | |
| 10,928,310 B2 | 2/2021 | Wissmann et al. | |
| 11,073,472 B2 | 7/2021 | Wissmann et al. | |
| 2001/0004285 A1 | 6/2001 | Cadell et al. | |
| 2005/0013746 A1 | 1/2005 | Lee et al. | |
| 2005/0168732 A1 | 8/2005 | Miller et al. | |
| 2010/0018330 A1 | 1/2010 | Marty et al. | |
| 2011/0267450 A1 | 11/2011 | Pronkine | |
| 2012/0140230 A1* | 6/2012 | Miller | G06T 7/0012 356/432 |
| 2013/0076882 A1 | 3/2013 | Toh | |
| 2013/0136473 A1* | 5/2013 | Kita | G03G 15/556 399/49 |
| 2014/0293036 A1 | 10/2014 | Ddecaux et al. | |
| 2014/0376932 A1* | 12/2014 | Koyama | G03G 15/5062 399/15 |
| 2015/0211992 A1 | 7/2015 | Ishizumi et al. | |
| 2015/0355208 A1* | 12/2015 | German | G01N 35/1011 422/65 |
| 2016/0025756 A1 | 1/2016 | Pollack et al. | |

FOREIGN PATENT DOCUMENTS

| | | |
|---|---|---|
| CN | 104364605 A | 2/2015 |
| EP | 1186893 B1 | 1/2008 |
| EP | 1967840 A2 | 9/2008 |
| EP | 2148205 A1 | 1/2010 |
| JP | 2006 010453 A | 1/2006 |
| JP | 2006-145549 A | 6/2006 |
| JP | 2010-032517 A | 2/2010 |
| JP | 2013-501937 A | 1/2013 |
| JP | 2015-004811 A | 1/2015 |
| WO | 0036400 A1 | 6/2000 |
| WO | 2016/133900 A1 | 8/2016 |
| WO | 2017/132171 A1 | 8/2017 |

OTHER PUBLICATIONS

Supplementary EP Search Report dated Jul. 7, 2020 of corresponding European Application No. 18836041.6, 7 Pages.

* cited by examiner

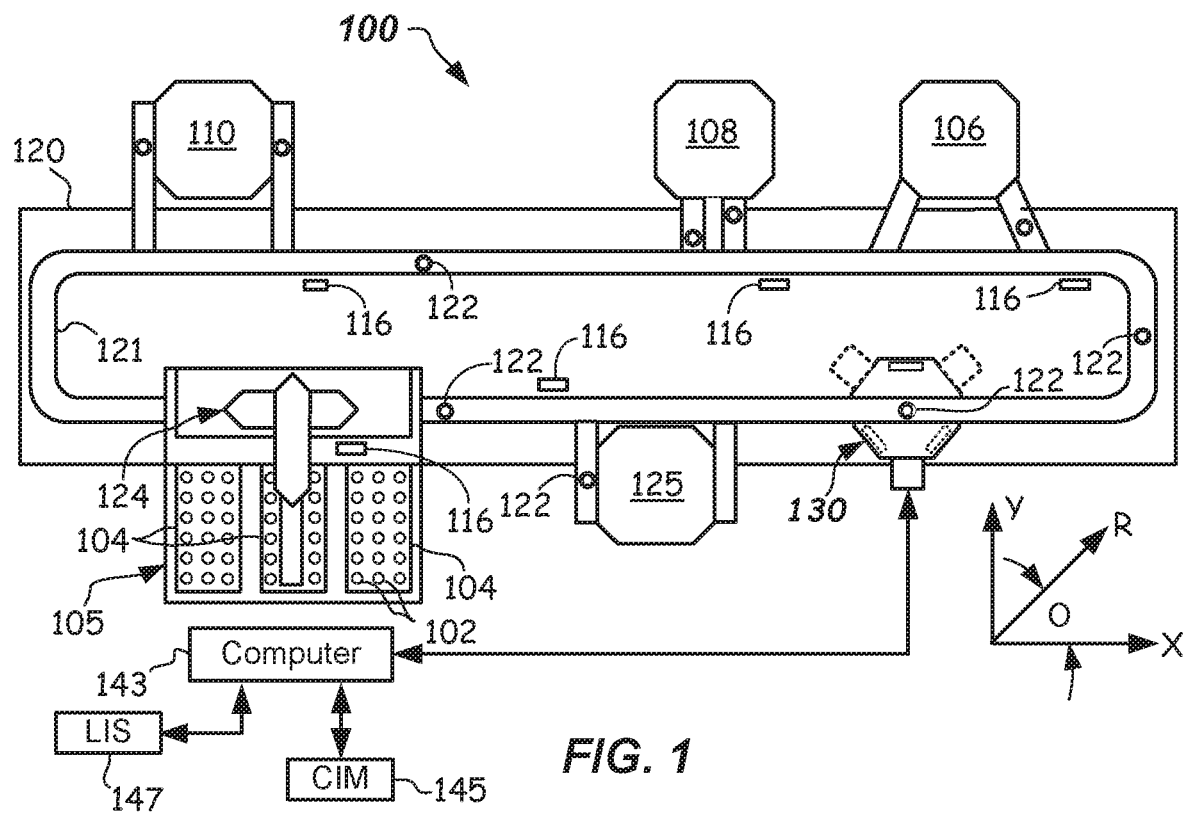
FIG. 1
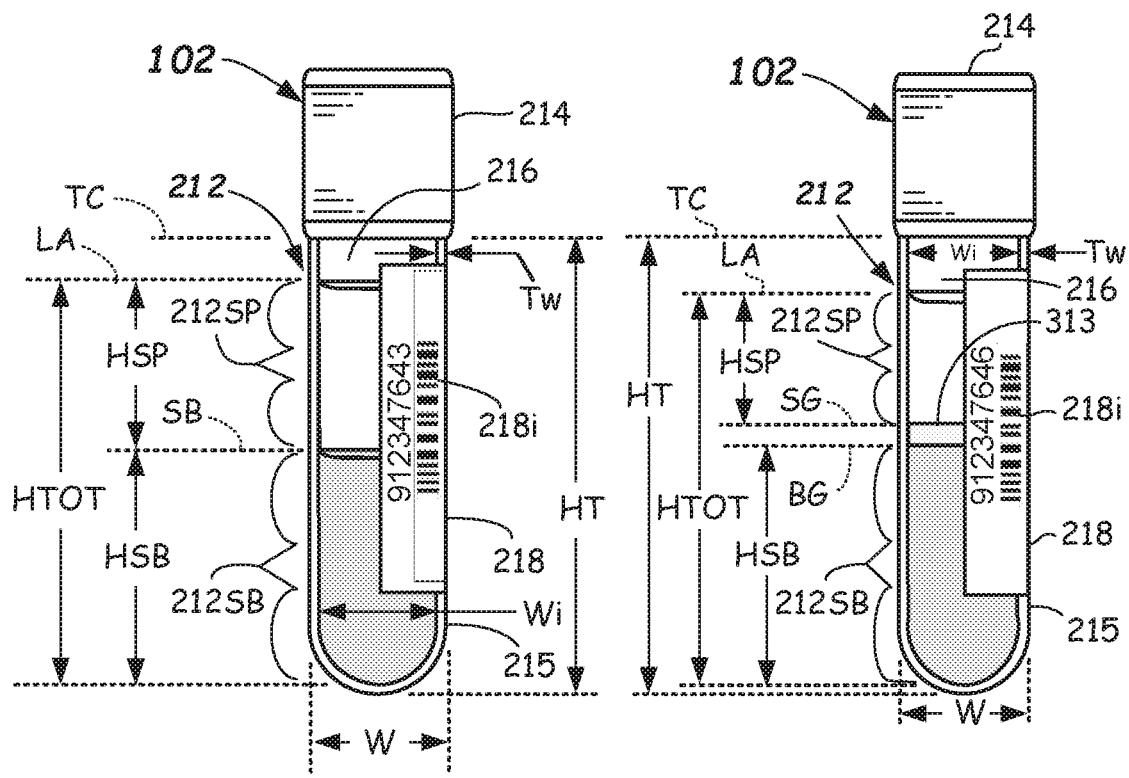
FIG. 2
FIG. 3

STRAY LIGHT COMPENSATING METHODS AND APPARATUS FOR CHARACTERIZING A SPECIMEN

CROSS-REFERENCE TO RELATED APPLICATIONS

This application claims priority to U.S. provisional application Ser. No. 62/534,645 filed Jul. 19, 2017, the contents of which is incorporated herein by reference in its entirety.

FIELD

The present disclosure relates to methods and apparatus for testing a biological specimen, and, more particularly to methods and apparatus for characterizing a specimen container and/or its contents.

BACKGROUND

Automated testing systems may conduct clinical chemistry or assays using one or more reagents to identify an analyte or other constituent in a biological specimen such as urine, blood serum, blood plasma, interstitial liquid, cerebrospinal liquids, and the like. For convenience and safety reasons, these specimens are almost always contained in specimen containers (e.g., blood collection tubes).

Improvements in automated testing have been accompanied by corresponding advances in automated pre-analytical specimen processing such as batch preparation, centrifugation of specimen to separate specimen constituents, cap removal to facilitate specimen access, aliquot preparation, pre-screening for hemolysis (H), icterus (I), and/or lipemia (L) (hereinafter referred to as "HIL"), or normality (N), and the like. Such automated pre-analytical specimen processing may be part of a Laboratory Automation System (LAS). The LAS automatically transports the specimens contained in specimen containers on carriers for pre-analytical specimen processing, as well as to analytical stations containing clinical chemistry analyzers and/or assay instruments (collectively referred to as "analyzers" herein) for testing. The test or assay reactions generate various changes that may be read and/or otherwise manipulated to determine a concentration of analyte or other constituent contained in the specimen.

LASs may handle any number of different specimens contained in labeled specimen containers (e.g., including a barcode label) at one time, and the specimen containers may be of all different sizes and types, which may also be intermingled. The barcode label may contain an accession number that may be correlated to demographic information that may be entered into a hospital's Laboratory Information System (LIS) along with test orders and other information. The LIS may interface and communicate with the LAS. An operator may place the labeled specimen containers onto the LAS, which may automatically transport the specimen containers for pre-analytical processing operations, all prior to the specimen actually being subjected to clinical analysis or assaying by the one or more analyzers.

In some embodiments of automated pre-analytical specimen processing on the LAS, a quality check module may receive a specimen containing a specimen and pre-screen the specimen for the presence of an interferent, such as HIL. The pre-screen for HIL involves capturing one or more images of the specimen container and specimen and then processing this image data to determine if H, I, and/or L is present, and possibly indexes (relative amounts) for H, I, and/or L if present, or if the specimen is normal (N). The presence of certain interferent in the specimen, as a result of sample processing or patient disease condition, may possibly adversely affect the accuracy of the test results of the analyte or constituent measurement later obtained from the analyzer.

In some systems, such as those described in U.S. Pat. No. 9,322,761 to Miller, it is described that rotating the specimen container enables the finding of a view window that is unobstructed by the one or more label(s) on the specimen container. Imaging may take place upon finding the view window.

In other systems, such as those described in WO2016/133900 to Park et al., the specimen container and specimen are imaged from multiple viewpoints and processed with a model-based system so that rotation of the specimen container is not needed.

However, such systems may, under certain conditions, provide image data from one or more image capture devices that may be somewhat corrupted. Thus, improved methods and apparatus adapted to compensate for corrupted image data of such specimens and/or specimen containers are sought.

SUMMARY

According to a first aspect, a quality check module is provided. The quality check module includes an imaging location within the quality check module configured to receive a specimen container containing a specimen, one or more image capture devices configured to capture images of the imaging location from one or more viewpoints, one or more light sources configured to provide back lighting for the one or more image capture devices, and one or more stray light patches located in an area receiving stray light from the one or more light sources.

In another aspect, a quality check module is provided. The quality check module includes an imaging location configured to receive a specimen container containing a specimen, an image capture device configured to capture images of the specimen container and specimen at the imaging location, a light source located adjacent to the imaging location and configured to provide back lighting for the image capture device, a stray light patch located in an area receiving stray light from the light source, and a computer configured to determine a stray light compensated image based at least upon a stray light intensity $\rho_{c,b}$ at the one or more stray light patch.

According to yet another aspect, a calibration method is provided. The calibration method includes providing an imaging location, an Image capture device on one side of the imaging location, and a backlight source on a second side of the imaging location opposite the first side, providing a calibration object at the imaging location, providing a stray light patch adjacent to the imaging location, illuminating the imaging location and the calibration object with the backlight source, capturing with the image capture device, an image of the front side of the calibration object and of the stray light patch, and determining a stray light intensity $\rho_{c,b}$ of the stray light patch and calibration image Intensity, $I_{c,b}$ of the front side of the calibration object.

Further, according to another aspect, a characterization method is provided. The characterization method includes providing a specimen container containing a specimen at an imaging location, providing one or more image capture devices configured to capture images at the imaging location, back lighting the imaging location with one or more light sources, providing a stray light patch located in an area receiving stray light from the one or more light sources, capturing an image of the specimen container, the specimen, and the stray light patch with the one or more image capture devices, and determining a stray light compensated image.

In another aspect, a specimen container carrier is provided. The specimen container carrier includes a carrier base, a plurality of tines extending from the carrier base, one or more springs coupled to the carrier base, wherein the plurality of tines and the one or more springs are configured to form a receptacle adapted to receive a specimen container therein, and one or more stray light patches provided on the specimen container carrier.

Still other aspects, features, and advantages of the present disclosure may be readily apparent from the following description illustrating a number of example embodiments, including the best mode contemplated for carrying out the present invention. The present invention may also be capable of other and different embodiments, and its several details may be modified in various respects, all without departing from the scope of the present disclosure. Moreover, while specific advantages have been enumerated, various embodiments may include all, some or none of the enumerated advantages. Accordingly, the drawings and descriptions are to be regarded as illustrative in nature, and not as restrictive. The disclosure is to cover all modifications, equivalents, and alternatives falling within the scope of the claims.

BRIEF DESCRIPTION OF THE DRAWINGS

The drawings, described below, are for illustrative purposes and are not necessarily drawn to scale. The drawings are not intended to limit the scope of the invention in any way.

FIG. 1 illustrates a top schematic view of a specimen testing apparatus including one or more quality check modules configured to carry out a stray light compensation method according to one or more embodiments.

FIG. 2 illustrates a side view of a specimen container including a specimen.

FIG. 3 illustrates a side view of a specimen container including a specimen and a gel separator.

DETAILED DESCRIPTION

Figure 4A:
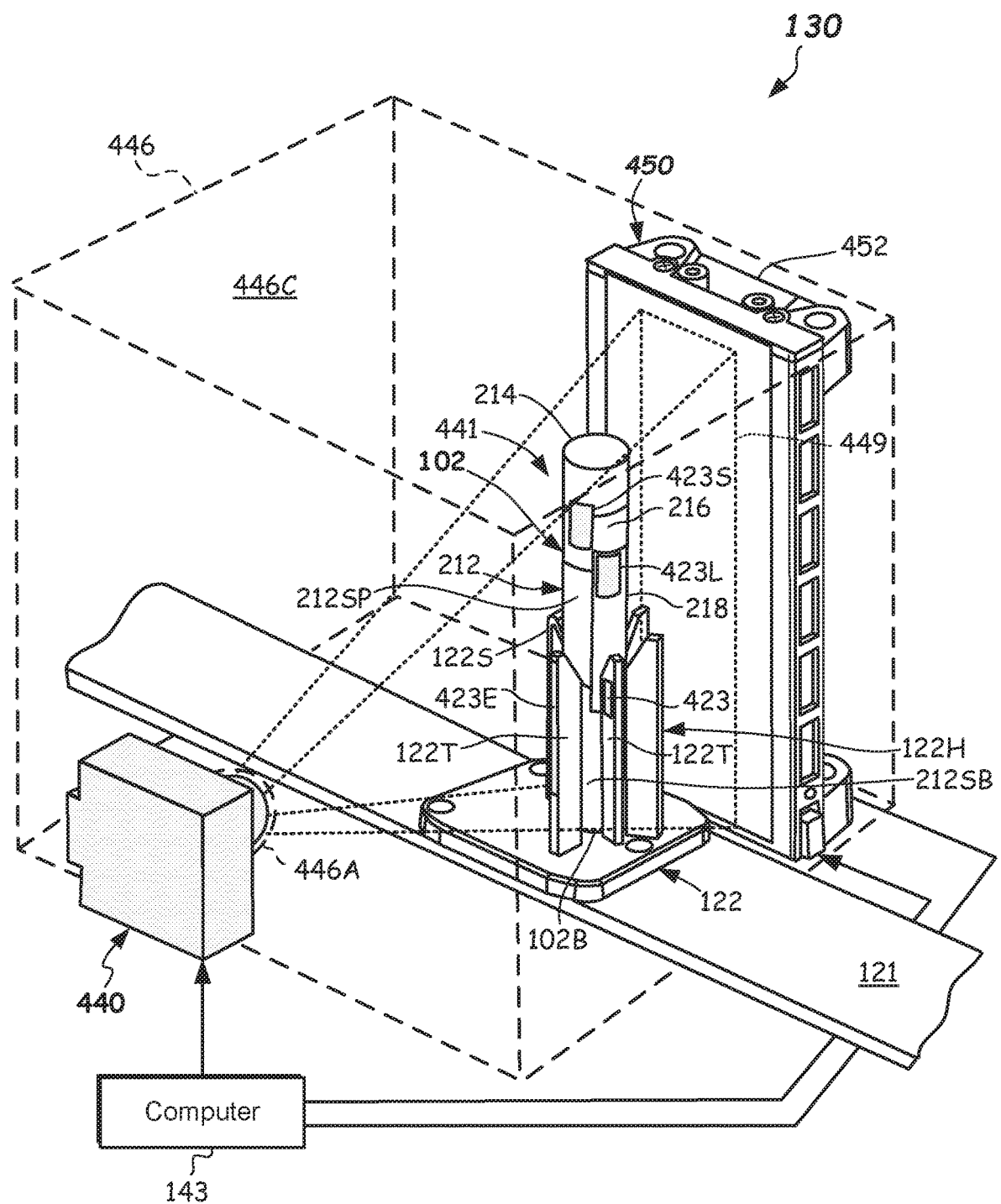
FIG. 4A illustrates an isometric view of a quality check module including stray light compensation according to one or more embodiments.

In a first broad aspect, embodiments of the present disclosure provide methods and apparatus configured to capture one or more images and characterize a specimen contained in a specimen container, wherein the one or more captured images are stray light compensated. In one or more embodiments, one end result of the characterization method may be the quantification of H, I, and/or L or N (hereinafter "HILN" herein) may be improved.

In particular, embodiments of the disclosure are directed at apparatus and methods configured to provide image data from one or more image capture devices that is not corrupted by reflections of stray light off from a front of the specimen container. In prior art imaging systems for characterizing a specimen in a specimen container, such as described in WO2016/133900 to Park et al., stray light from the light source may not only pass through the specimen container and specimen so that a front viewpoint image may be obtained, but in some instances, stray light may pass around the specimen container and reflect off from internal surfaces or components of a quality check module carrying out the specimen imaging. The stray light that does not pass through the specimen, may be reflected onto the front face of the specimen container and undesirably illuminates the front face thereof, thereby resulting in intensity readings captured by the image capture device that are artificially high. Accordingly, apparatus and methods disclosed herein compensate for such stray light and thus image intensity is adjusted to minimize the effects of the stray light.

The specimen, as described herein, is collected in a specimen container, such as a blood collection tube and may include a settled blood portion and a serum and plasma portion after separation (e.g., fractionation using centrifugation). The settled blood portion (sometimes referred to as the "packed cell portion") is made up blood cells such as white blood cells (leukocytes), red blood cells (erythrocytes) and platelets (thrombocytes) which are aggregated and separated from the serum or plasma portion. It is generally found at the bottom part of the specimen container. The serum or plasma portion is the liquid component of blood that is not part of the settled blood portion. It is generally found above the settled blood portion. Plasma and serum differ primarily in the content of coagulating components, primarily fibrinogen. Plasma is the un-clotted liquid, whereas serum refers to blood plasma that has been allowed to clot, either under the influence of endogenous enzymes or exogenous components. In some specimen containers, a small gel separator (e.g. plug) may be used, which positions itself between the settled blood portion and the serum or plasma portion during fractionation. It serves as a barrier between the two portions.

In accordance with one or more embodiments, the characterization apparatus and method described herein may be used to carry out pre-analytical testing or pre-screening. For example, in one or more embodiments, the characterization method may be carried out prior to the specimen being subjected to analysis (clinical chemistry or assaying) on one or more analyzers. In particular, one or more embodiments of the present disclosure provides for characterization of the specimen as a prerequisite for further testing. In one or more embodiments, the characterization of the specimen may be determined at a quality check module. The quality check module may include one or more image capture devices arranged to provide lateral 2D images of the specimen container and specimen from one or more different lateral viewpoints. During image capture, the specimen container and specimen may be backlight illuminated, i.e., illuminated behind the specimen container and specimen. The illumination produced may be by light panel assemblies.

In one or more embodiments, the characterization of the specimen and/or specimen container may be carried out using back lighting with the panelized light sources coupled with high dynamic range (HDR) image processing. The method and apparatus may be used to quantify the specimen, including quantification of intensities of light transmission through the specimen at various spatial locations. Optionally or additionally, the characterization methods and apparatus may be used to determine a location of the interface boundaries of the serum or plasma portion and/or the settled blood portion, and/or gel separator, as well as the volume and/or depth of these components with great precision using HDR image processing and stray light compensation. In some embodiments, characterization of geometrical or other features of the specimen container may be determined using the apparatus and methods, such as the container type (via identification of height and/or width thereof), the cap type, and/or the cap color.

In short, the back illuminated and stray light compensated, 2D image data sets for one or more viewpoints may be used to characterize the specimen container and/or specimen. The 2D image data sets obtained with back lighting with the panelized light sources and stray light compensation may also be used to determine or verify information about the specimen, such whether an interferent, such as hemolysis (H), icterus (I), and/or lipemia (L) (hereinafter "HIL") is present in the specimen, or if the specimen is normal (N).

If after characterization by the method and apparatus, the serum or plasma portion is found to contain one or more of H, I, and/or L, the specimen may be subjected to further processing. For example, the specimen may be subjected to further processing to reduce Lipemia or for more precise characterization of indexes for, H, I, or L. After such further processing, the specimen may be allowed, in some embodiments, to continue on and undergo routine analysis by the one or more analyzers. In other cases, the specimen may be discarded and redrawn. In other embodiments, the specimen may be pre-screened by the quality check module a second time. If the pre-screening finds that the specimen is normal (N), then the specimen may be directly routed to, and undergo routine analysis by, one or more analyzers.

In one or more embodiments, the quality check module may be provided as part of the LAS where a track transports the specimen to one or more analyzers, and to a quality check module provided at any suitable location on or along the track. For example, the quality check module may be located at a loading station, or elsewhere along the track, so that the specimen and specimen container can be characterized while residing on the track. However, to be clear, the quality check module including back lighting and stray light compensation may not be included on a track and the specimen container including specimen may be loaded and unloaded therefrom either manually or by a robot.

In some embodiments, the characterization may include HDR image data processing including capturing multiple images at multiple exposures (e.g., exposure times) and with back illumination using multiple different spectra having different nominal wavelengths. The multiple images may be obtained using one or more image capture devices. For example, in some embodiments, multiple image capture devices may be arranged to take the images from different lateral viewpoints. The images may be produced using panelized back illumination for each viewpoint. The spectral light sources for back illumination may include red (R) light sources, green (G) light sources, and blue (B) light sources. Optionally, white light, near-infrared, or even infrared light sources may be used. Images at multiple exposure times for each spectrum may be obtained by the quality check module. For example, 4-8 images at different exposure times may be obtained at each spectrum (or wavelength range). These multiple images may then be further processed by a computer to generate characterization results. As part of the image processing, stray light compensation is carried out to suitably adjust image intensities to minimize the effect of stray light.

Further details of the inventive characterization methods, quality check modules, and specimen testing apparatus including one or more quality check modules will be further described with reference to FIGS. 1-10 herein.

FIG. 1 shows a specimen testing apparatus 100 capable of automatically processing multiple ones of the specimen containers 102 (e.g., specimen collection tubes—see FIGS. 2 and 3). The specimen containers 102 may be contained in one or more racks 104 at a loading area 105 prior to transportation to, and analysis by, one or more analyzers (e.g., first, second, and third analyzer 106, 108, 110, respectively, arranged about the specimen testing apparatus 100). It should be apparent that more or less numbers of analyzers can be used. The analyzers may be any combination of clinical chemistry analyzers, assaying instruments, and/or the like. The specimen containers 102 may be any generally transparent or translucent container, such as a blood collection tube, test tube, sample cup, cuvette, or other generally clear glass or plastic container configured to contain a specimen 212 therein.

Typically, a specimen 212 (FIGS. 2 and 3) to be automatically processed may be provided in specimen containers 102, which may be capped with a cap 214 (FIGS. 2 and 3). The caps 214 may have different shapes and/or colors (e.g., red, royal blue, light blue, green, grey, tan, or yellow, or combinations of colors), which may have meaning in terms of what test the specimen container 102 is used for, the type of additive contained therein, or the like. Other colors may be used. According to one aspect, it may be desirable to image the cap to characterize information about the cap so that it can be used to cross check with test orders.

Each of the specimen containers 102 may be provided with identification information 218*i* (i.e., indicia), such as a barcode, alphabetic, numeric, alphanumeric, or combination thereof that may be machine readable at locations about the specimen testing apparatus 100. The identification information 218*i* may indicate, or may otherwise be correlated, via a Laboratory Information System (LIS) 147, to a patient's identification as well as tests to be carried out on the specimen 212, or other information from the LIS 147, for example. Such identification information 218*i* may be generally provided on a label 218 adhered to, or otherwise provided on the side of, the specimen container 102. The label 218 generally does not extend all the way around the specimen container 102, or all along a height of the specimen container 102. In some embodiments, multiple labels 218 may be adhered, and may slightly overlap each other. Accordingly, although the label 218 may occlude a view of a portion of the specimen 212, but some portion of the specimen 212 may still be viewable from certain viewpoints. One or more embodiments of the method and quality check module enable the characterization of the specimen 212 and/or specimen container without rotation of the specimen container 102.

As best shown in FIGS. 2 and 3, the specimen 212 may include a serum or plasma portion 212SP and a settled blood portion 212SB contained within the tube 215. Air 216 may be provided above the serum and plasma portion 212SP and a line or demarcation between the air 216 and the serum and plasma portion 212SP is defined herein as a liquid-air interface (LA). A line of demarcation between the serum or plasma portion 212SP and the settled blood portion 212SB is defined herein as a serum-blood interface (SB), and is shown in FIG. 2. An interface between the air 216 and the cap 214 is referred to herein as a tube-cap interface (TC). A height of the serum or plasma portion 212SP is (HSP) and is defined as a height from a top of the serum or plasma portion 212SP to a top of the settled blood portion 212SB. A height of the settled blood portion 212SB is (HSB) and is defined as a height from a bottom of the settled blood portion 212SB to a top of the settled blood portion 212SB at SB in FIG. 2. HTOT in FIG. 2 is a total height of the specimen 212 and HTOT=HSP+HSB.

In cases where a gel separator 313 is used (see FIG. 3), a height of the serum or plasma portion 212SP is (HSP) and is defined as a height from the top of the serum or plasma portion 212SP at LA to the top of the gel separator 313 at SG. A height of the settled blood portion 212SB is (HSB) and is defined as a height from the bottom of the settled blood portion 212SB to the bottom of the gel separator 313 at BG. HTOT in FIG. 3 is the total height of the specimen 212 and is defined as HTOT=HSP+HSB+height of the gel separator 313. In each case, the wall thickness is Tw, the outer width is W, and the inner width of the specimen container 102 is Wi. A height of the tube (HT) is defined herein as the height from the bottom-most part of the tube 215 to the bottom of the cap 214.

In more detail, specimen testing apparatus 100 may include a base 120 (e.g., a frame or other structure) upon which a track 121 may be disposed. The track 121 may be a railed track (e.g., mono or multiple rail tracks), a collection of conveyor belts, conveyor chains or links, movable platforms, or any other suitable type of conveyance mechanism. Track 121 may be circular, serpentine, or any other suitable shape and may be a closed track (e.g., endless track). Track 121 may, in operation, transport individual ones of the specimen containers 102 to destination locations spaced about the track 121 in specimen container carriers 122 (hereinafter "carriers 122").

Carriers 122 may be passive, non-motored pucks that may be configured to carry a single specimen container 102 on the track 121, where the track 121 is movable. Optionally, carrier 122 may be automated including an onboard drive motor, such as a linear motor that may be programmed to move about the track 121 and stop at pre-programmed locations, where the track 121 is stationary. In either case, the carriers 122 may each include a holder 122H (FIGS. 4A, 4D, 4E) configured to hold the specimen container 102 in a defined upright position. The holder 122H may include a plurality of fingers or leaf springs, or combinations thereof that may support and secure the specimen container 102 in the carrier 122, but where some of which may be laterally movable or flexible to accommodate for different sizes of specimen containers 102 to be received therein. Carriers 122 may exit from the loading area 105. In some embodiments, loading area 105 may serve a dual function of allowing offloading of the specimen containers 102 from the carriers 122 after completion of analysis. Otherwise, a suitable offloading lane (not shown) may be provided elsewhere on the track 121.

A robot 124 may be provided at the loading area 105 and may be configured to grasp the specimen containers 102 from the one or more racks 104 and load them onto the carriers 122, such as on an input lane or other location of the track 121. The robot 124 may include one or more (e.g., at least two) robot arms or components capable of X and Z, Y and Z, X, Y, and Z, r and theta, or r, theta, and Z motion, wherein Z is out of the paper in FIG. 1. Robot 124 may be a gantry robot, an articulated arm robot, an R-theta robot, or other suitable robot type wherein the robot 124 may be equipped with robotic gripper fingers that may be sized to pick up and place the specimen containers 102 at programmed locations.

Upon being loaded onto track 121, the specimen containers 102 carried by carriers 122 may progress to a centrifuge 125 configured to carry out fractionation of the specimen 212. Carriers 122 carrying specimen containers 102 may be diverted to the centrifuge 125 by inflow lane or a suitable robot (not shown). After being centrifuged, the specimen containers 102 may exit, and continue on the track 121. In the depicted embodiment, the specimen container 102 in carrier 122 may next be transported to a quality check module 130 including stray light compensation to be further described herein with reference to FIGS. 4A-4C.

The quality check module 130 is configured and adapted to characterize the specimen 212 contained in the specimen container 102, and may be adapted to characterize the specimen container 102 in some embodiments. Quantification of the specimen 212 may take place at the quality check module 130 and may include determination of HSP, HSB, or even HTOT, and determination of location of LA, SB or SG, and/or BG). The quality check module 130 may also be configured for determining a presence of an interferent, such as one or more of hemolysis (H), icterus (I), and/or lipemia (L) contained in a specimen 212. In some embodiments, quantification of the physical attributes of the specimen container 102 may take place at the quality check module 130 such as determining HT, tube outer width (W) and/or tube inner width (Wi), TC, or even cap color or cap type. Thus, the size and type of specimen container 102 may be determined.

Once the specimen 212 is characterized, the specimen 212 may be forwarded to be analyzed in the one or more analyzers (e.g., first, second and third analyzers 106, 108, and/or 110) before returning each specimen container 102 to the loading area 105 for offloading. Furthermore, additional stations (not shown) may be arranged around the track 121 at various desirable locations, such as a de-capping station, an aliquoting station, one or more additional quality check module(s), and the like.

The specimen testing apparatus 100 may include sensors 116 at one or more locations around the track 121. Sensors 116 may be used to detect a location of specimen containers 102 along the track 121 by means of reading the identification information 218i (FIGS. 2 and 3) placed on the specimen container 102, or like information (not shown) provided on each carrier 122. In some embodiments, a barcode may be provided on the carrier 122. Other means for tracking the location of the carriers 122 may be used, such as proximity sensors. All of the sensors 116 may interface with the computer 143 so that the location of each specimen container 102 may be known at all times.

Specimen testing apparatus 100 may be controlled by the computer 143, which may be a microprocessor-based central processing unit (CPU), having a suitable memory and suitable conditioning electronics, drivers, and software for operating the various automated components. Computer 143 may be housed as part of, or separate from, the base 120. The computer 143 may operate to control movement of the carriers 122 to and from the loading area 105, motion about the track 121, and motion to and from the centrifuge 125, motion to and from the quality check module 130. Computer 143 may also control operation of the quality check module 130 and the characterization and stray light compensation described herein. Computer 143 or a separate computer may control operation of the centrifuge 125, and motion to and from each analyzer 106, 108, and 110. Usually a separate computer may control operation of each analyzer 106, 108, 110.

For all but the quality check module 130, the computer 143 may control the specimen testing apparatus 100 according to software, firmware, and/or hardware commands or circuits such as those used on the Dimension® clinical chemistry analyzer sold by Siemens Healthcare Diagnostics Inc. of Tarrytown, N.Y., and such control is typical to those skilled in the art of computer-based electromechanical control programming and will not be further described herein. However, other suitable systems for controlling the specimen testing apparatus 100 may be used.

Embodiments of the present disclosure may be implemented using a computer interface module (CIM) 145 that allows the user to readily access a variety of status and control display screens. These status and control screens may describe some or all aspects of a plurality of interrelated automated devices used for pre-screening, preparation, and analysis of specimens 212. The CIM 145 may be employed to provide information about the operational status of a plurality of interrelated automated devices, as well as information describing the location of any specimen 212 as well as a status of tests to be performed on, or being performed on, the specimen 212. The CIM 145 may thus be adapted to facilitate interactions between an operator and the specimen testing apparatus 100. The CIM 145 may include a display screen adapted to display a menu including icons, scroll bars, boxes, and buttons through which the operator may interface with the specimen testing apparatus 100. The menu may comprise a number of function buttons programmed to display functional aspects of the specimen testing apparatus 100.

Pre-screening the specimen 212 in accordance with one or more aspects of the disclosure allows for accurate quantification of the relative amounts of the serum or plasma portion 212SP and/or the settled blood portion 212SB, and/or a ratio there between. Further, pre-screening may determine physical vertical locations of LA, SB or SG, and/or a bottom-most part of specimen container 102. Quantification ensures that the specimen 212 can be stopped from progressing on to the one or more analyzers 106, 108, 110, if an insufficient amount of serum or plasma portion 212SP is available to carry out the ordered tests. In this way, inaccurate test results may be avoided via avoiding the possible aspiration of air. The ability to accurately quantify the physical location of LA and SB or SG may minimize not only the possibility of aspirating air, but also minimize the possibility of aspirating either settled blood portion 212SB or gel separator 313 (if present). Thus, clogging and contamination of the specimen aspirating pipette used to aspirate serum or plasma portion 212SP for the analyzers 106, 108, 110 or at an aliquoting station may be avoided or minimized.

Figure 4B:
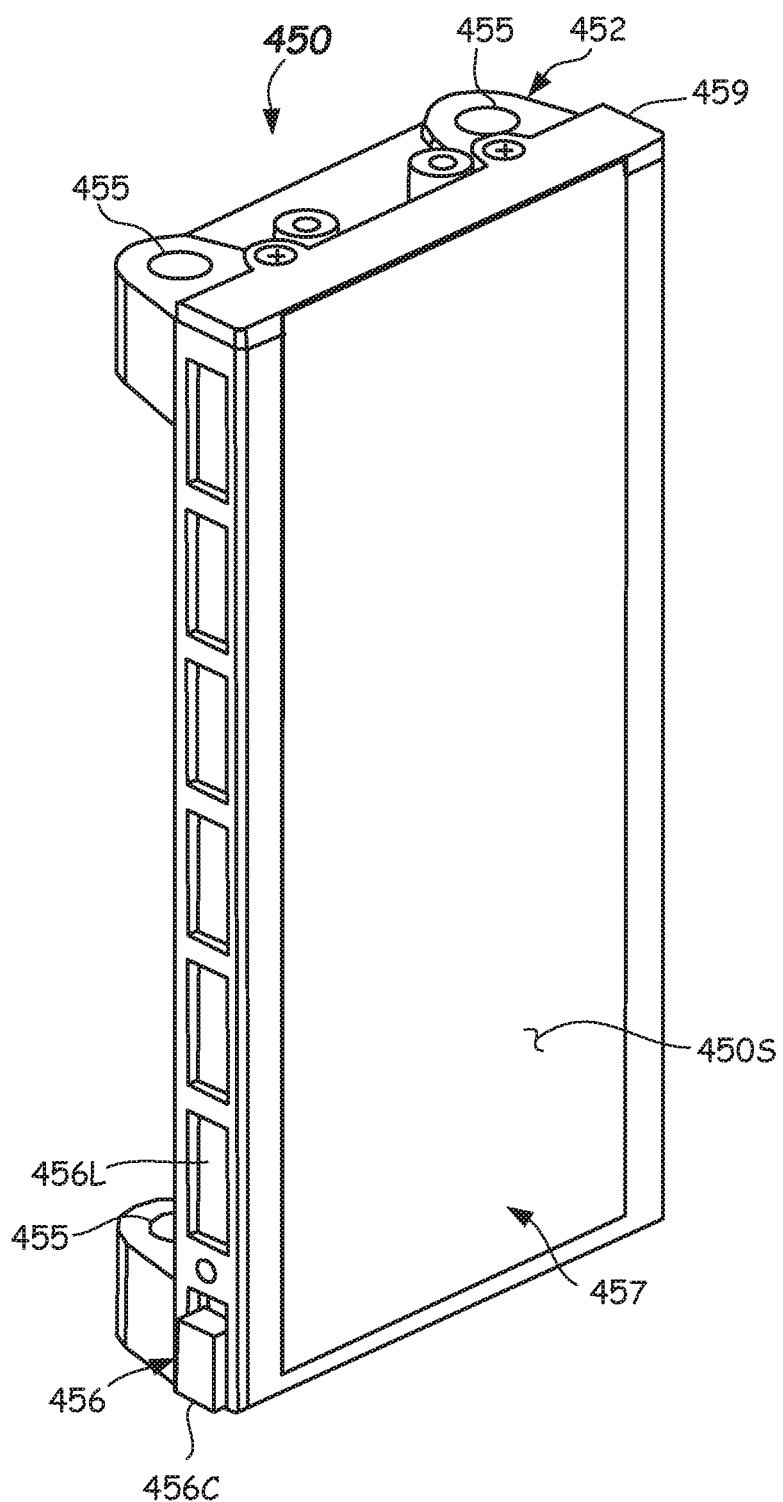
FIG. 4B illustrates an isometric view of a light panel assembly of FIG. 4A according to one or more embodiments.
Figure 4C:
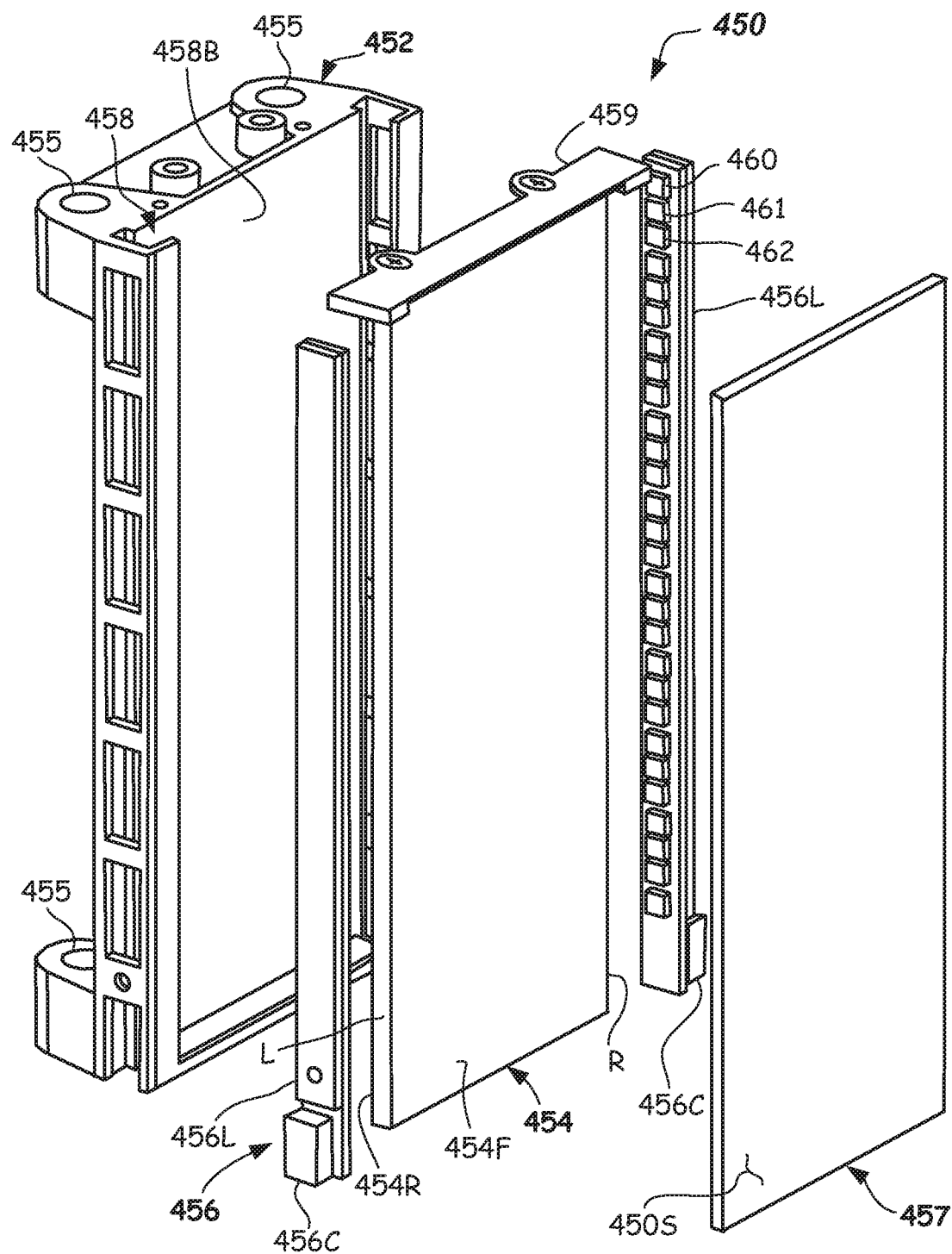
FIG. 4C illustrates an exploded view of various components of a light panel assembly of FIG. 4B according to one or more embodiments.

With reference to FIGS. 4A-4C, a first embodiment of a quality check module 130 including a lighting source embodied as a light panel assembly 450, which may include spectrally switchable light sources, is shown and described. Quality check module 130 may be configured and adapted to automatically characterize and/or quantify the specimen 212 (e.g., the serum or plasma portion 212SP, the settled blood portion 212SB, or both) and/or may quantify the specimen container 102. The images obtained by the quality check module 130 may allow for precise aspiration pipette and/or gripper positioning, determination that a sufficient amount (e.g., volume or height) of the serum or plasma portion 212SP is available for the tests that have been ordered, and/or for the identification of H, I, and/or L or N (hereinafter HILN). Thus, using the quality check module 130 may help avoiding gripper crashes, pipette clogging, air aspiration by the pipette, and/or identify HILN, such that valuable analyzer resources are not wasted and that confidence in the test results may be improved.

Now referring to FIG. 4A, a first embodiment of a quality check module 130 is shown. Quality check module 130 may include an image capture device 440 that is configured to capture a digital image (i.e., a pixelated image) at an imaging location from a lateral viewpoint. Image capture device 440 may be a digital camera, a charged coupled device (CCD), an array of photodetectors, one or more CMOS sensors, or the like. The image capture device 440, in this embodiment, is configured to take images of the specimen container 102 and specimen 212 contained therein from a single lateral viewpoint. The image capture device 440 may be capable of taking a digital image having any suitable image size. For example the image size that may be 2560 pixels×694 pixels (height×width). In another embodiment, the image capture device 440 may have an image size of 1280 pixels×384 pixels. Other sizes and pixel densities may be used.

The image capture device 440 may be provided in close proximity to, and trained or focused to capture a view 449 window at an imaging location 441 including an expected location of the specimen container 102. In some embodiments, the specimen container 102 may be placed at or stopped at the imaging location 441, such as by stopping on a track 121 or being placed at the imaging location 441 by a robot, so that it is approximately located in a center of the view window 449. As configured, the image capture device 440 can generate digital images that include portions of the serum or plasma portion 212SP, portions of the settled blood portion 212SB, and some of the cap 214, and possibly the bottom-most portion 212B of the tube 215, for example.

Referring again to FIGS. 4A-4C, the quality check module 130 may include spectrally-switchable lighting source, as shown provided by the light panel assembly 450 to provide spectrally-switchable backlighting. The spectrally-switchable lighting source may be spectrally-switchable between at least two light spectra, and in some embodiments, between 3 or more discreet spectrum. The light panel assembly 450 may include, as shown in FIGS. 4B and 4C, a frame 452, a light guide 454, and a light source 456 operational to cause light emission from a front surface 450S. In the depicted embodiment, the light source 456 may emit light into the lateral edges L, R (e.g., the side edges) of the light guide 454. The light panel assembly 450 may further include a diffuser 457, where one surface of the diffuser 457 functions as the front surface 450S of the light panel assembly 450. The light panel assembly 450 is a light source configured to provide back lighting for the one or more image capture devices 440, as shown.

The frame 452 may be made of a rigid material, such as plastic, and may include suitable fastening structures, such as bores 455 that are adapted to be mounted onto fixed mounting rods (not shown). Other suitable mounting features may be included for mounting the light panel assembly 450 in a fixed orientation to the imaging location 441. Frame 452 may include a pocket 458 that may include an open front and top and a closed back surface 458B and bottom and that is configured to receive and position the light guide 454 and the diffuser 457 (if used) therein. The light guide 454 and diffuser 457 may be inserted into the pocket 458 from the top and secured in place with securement member 459. Other means for securing the light guide 454 and the diffuser 457 in the frame 452 may be used. The light guide 454 may be made of a suitably transparent light guide material including light diffusing capability, such as provided by a plastic sheet including internal light diffusing particles or other means of internal light diffusion. One suitable material is Acrylite LED® EndLighten, a product available from Evonik Industries AG of Essen, Germany. The light guide 454 may be made of a sheet having a width of between about 60 mm and about 150 mm, a height of between about 120 mm and 180 mm, and a thickness of between about 3 mm and about 5 mm, for example. In one embodiment useful for backlighting, the light guide 454 may be made of a sheet having a width of about 60 mm, a height of about 150 mm, and a thickness of about 4 mm, for example. Other suitable sizes may be used.

In the depicted embodiment of FIGS. 4A and 4B, the light guide 454 functions by guiding light emitted laterally into the lateral edges L, R thereof by light arrays 456L (LED strip modules) of the light source 456 through the bulk material of the light guide 454 and emitting light on the front face 454F and rear face 454R of the light guide 454 due to light interactions with the light diffusing particles therein. In some embodiments, the rear face 454R of the light guide 454 may include a highly reflective material formed thereon to reflect or backscatter any light transmission passing towards the back surface 458B and direct it back into the bulk material of the light guide 454 so that it may then be emitted from the front face 454F. Optionally, a highly reflective material may be provided on the back surface 458B of the frame 452 or as an individual element between the back surface 458B and the light guide 454. The highly reflective material may be provided by as a mirror or a white plastic element, or other plastic or glass element with a metallic coating of silver, gold, chrome, tin, or combinations, for example. The light emitted from the front face 454F may be radiated substantially uniformly across the entire front surface 450S of the light panel assembly 450 and illuminates the specimen container 102 and specimen 212.

The light source 456 may include light arrays 456L arranged adjacent to both lateral edges L, R of the light guide 454. The light arrays 456L may be LED strip modules including a linear array of individual light source elements (e.g., light emitting diodes—LEDs) arranged linearly along the lateral edges L, R of the light guide 454. The light arrays 456L each may include a plurality of LEDs, such as between about 8 and 80 LEDs, for example, that may be arranged on a circuit board with a connector 456C provided to allow electrical connection to the computer 143. The light arrays 456L may be provided along the respective sides of the pocket 458 and are configured such that the emitting portion of each of the light sources (e.g., LEDs) may be provided directly adjacent to the lateral edges L, R, and even touching the lateral edges L, R, if possible.

The light arrays 456L may provide switchable multi-spectral illumination. For example, in one embodiment, the light arrays 456L may include a plurality of independently switchable lighting elements, or lighting elements that may be switchable in groups, such as LEDs that have different light emission spectra. The switching of the lighting elements may be accomplished by software operable on the computer 143 coupled with an appropriate power source and drivers. Thus, the light panel assembly 450 may be illuminated at multiple different spectra having different nominal wavelengths by selecting only some of the lighting elements for illumination at a time.

For example, LEDs may include different colored LEDs, such as red LEDs 460 (R), green LEDs 461 (G), and blue LEDs 462 (B) that emit light spectra at different nominal wavelengths. The light panel assembly 450 may emit red light at 634 nm+/−35 nm, green at 537 nm+/−35 nm and blue at 455 nm+/−35 nm, for example. In particular, the light arrays 456L may include clusters of R, G & B LEDs 460, 461, 462 that may be repeatedly arranged in a repeating pattern along the height of the light arrays 456L. High power Oslon SSL model LEDs available from Osram Opto Semiconductors GmbH of Regensburg, Germany may be used, for example. Each of the same-colored LEDs may be illuminated at once. For example, each of the red LEDs 460 may be turned on simultaneously to provide red illumination from the light panel assembly 450 to illuminate the specimen container 102 containing specimen 212 at the imaging location 441 during imaging thereof. Likewise, each of the green LEDs 461 may be turned on simultaneously to provide green illumination during imaging. Similarly, each of the blue LEDs 462 may be turned on simultaneously to provide blue illumination during imaging. It should be recognized that R, G, and B are only examples, and that other wavelength light sources may be used.

In some embodiments, some of the lighting source may include white light sources, such that white light (e.g., wavelength range of about 400 nm to about 700 nm) may be selected for certain types of imaging. In other embodiments, UV (wavelength range of about 10 nm to about 400 nm), near infra-red (wavelength range of about 700 nm to about 1250 nm) or even mid-infrared (wavelength range of about 1250 nm to about 2,500 nm) may be included, and may be switched on at times for certain types of imaging. Thus, one or more embodiments of light panel assembly 450 may include at least two switchable lighting elements having different emission spectra. In some embodiments, switchable R, G and B lighting elements are provided. In some embodiments, switchable R, G, B, and white lighting elements are provided. In yet other embodiments, switchable R, G, B, and UV lighting elements are provided. In yet other embodiments, switchable R, G, B, and near-infrared lighting elements are provided. Any combination of two or more of switchable R, G, B, white, UV, and near-infrared lighting elements may be provided in the light panel assembly 450. For near infrared, LEDs having a wavelength of 850 nm+/−

20 nm may be used. In all embodiments, the combination of switchable lighting elements may be provided in generally equal amounts and generally evenly spaced along the height of the light guide 454.

The light panel assembly 450 may optionally include a diffuser 457 including diffusing properties and may be provided as a sheet of Acrylite® Satince available from EVONIK of Essen, Germany in some embodiments. The OD010 DF colorless was found to work well. The diffuser 457 may be a sheet having height and width dimensions approximately the same as the light guide 454 and a thickness of between about 2 mm and about 4 mm, for example. Other dimensions may be used. The diffuser 457 functions by scattering light passing through it. The diffuser 457 and the light guide 454 may be provided in spaced relationship to one another with a slight gap formed there between. The gap may be, for example, between about 1 mm and about 5 mm, and about 2.4 mm in some embodiments. The quality check module 130 may include an enclosure 446 (shown dotted) that may at least partially surround or cover the track 121. The enclosure 446 may be a box-like structure provided to eliminate lighting variances due to changes in ambient lighting. The enclosure 446 forms an imaging chamber 446C enclosing at least some of a space including the imaging location 441, and the one or more image capture devices 440 reside (e.g., are located at a position) that is outside of the imaging chamber 446C. Imaging may take place through an aperture 446A formed in the enclosure 446. The enclosure 446 may include doors (not shown in FIG. 4B) that are located on opposing sides of the enclosure 446 and allow the carrier 122 holding specimen container 102 to enter into and exit from the imaging chamber 446C on track 121.

In the depicted embodiment, the specimen container carrier 122, which is configured to hold the specimen container 102, may include one or more stray light patches 423 thereon. The one or more stray light patches 423 are located in an area(s) receiving stray light from the light source (e.g., light panel assembly 450). Stray light is defined herein as light that has passed around the specimen container 102 and which has been reflected off from the internal walls of the enclosure 446 or other structures inside of the imaging chamber 446C and onto the front surface of the specimen container 102 facing the image capture device 440. The stray light patch 423 may be a patch of material, such as a white-colored sticker. The color of the stray light patch 423 should be lighter than the background material it is provided on. In some embodiments, the stray light patch 423 may include a darker border thereon to aid in locating the stray light patch 423.

Figure 4D:
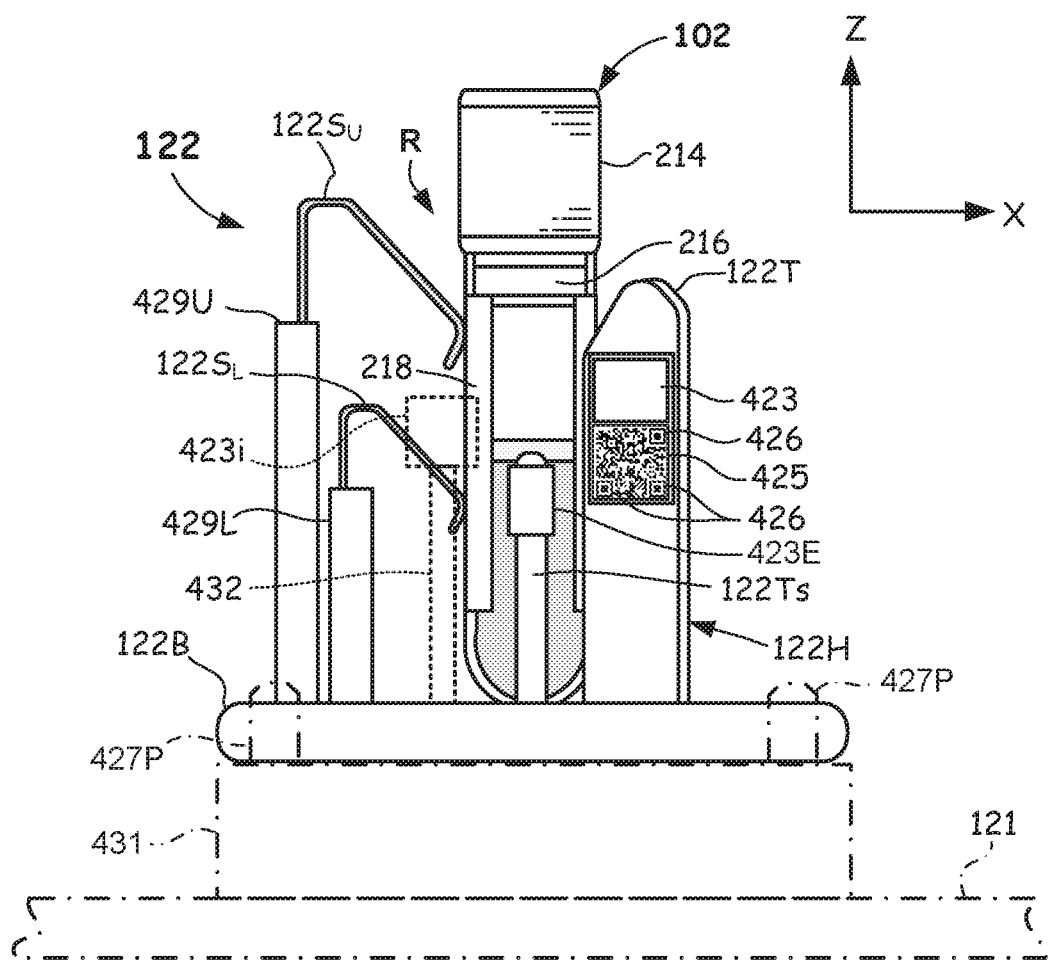
FIG. 4D illustrates a schematic side view of a specimen container carrier including one or more stray light patches according to one or more embodiments.
Figure 4E:
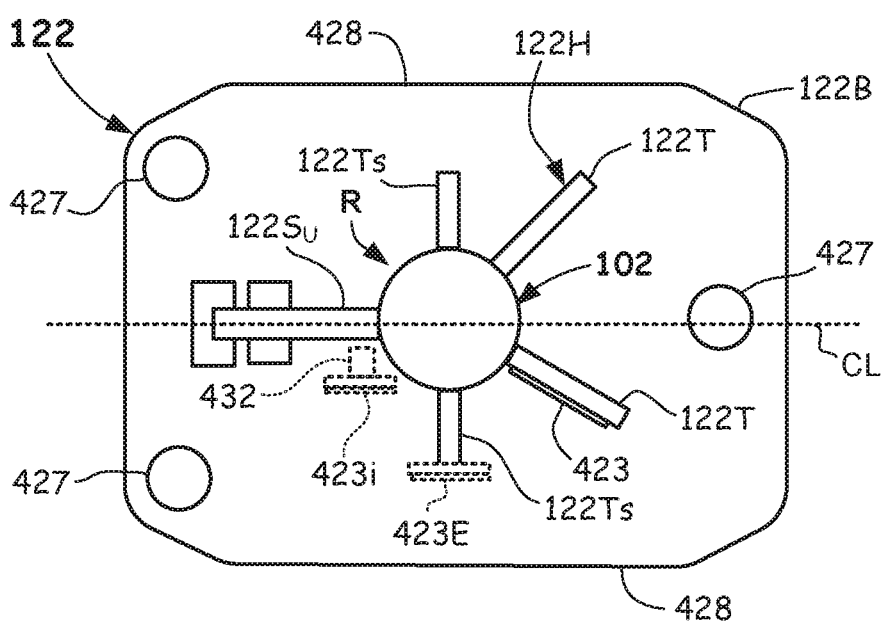
FIG. 4E illustrates a schematic top view of a specimen container carrier including one or more stray light patches according to one or more embodiments.

As is shown in FIGS. 4D and 4E, the specimen container carrier 122 (hereinafter "carrier") configured to support the specimen container 102 in an upright orientation and transport the specimen container 102 is shown. The carrier 122 may include a carrier base 122B and support elements coupled to the carrier base 122B forming a receptacle R that is configured and adapted to receive and support a specimen container 102 therein. The support elements may be any suitable structure configured to support the specimen container 102 is an upright orientation, such as a plurality of tines 122T, 122Ts extending upwardly from the carrier base 122B, and possibly one or more springs coupled to the carrier base 122B. Other suitable support elements may be used.

In some embodiments, one or more stray light patches 423 may be applied to one or more tines 122T of a holder 122H, which is part of the carrier 122, or elsewhere on the carrier 122. However, in other embodiments described herein, the one or more stray light patches may be provided at locations other than on the carrier 122.

In one example where the carrier 122 includes the one or more stray light patches 423, the holder 122H may include multiple tines 122T that may extend upwardly, and together with one or more spring members 122S, define a receptacle R configured to receive, support, and hold the specimen container 102 therein. The one or more stray light patches 423 may be located in an area directly adjacent to an area of most imaging importance. For example, the stray light patch 423 can be placed as close to the serum or plasma portion 212SP as possible, as this is one area for which accurate image intensity information is sought. For example, accurate image intensity measurements are desired for accurate HILN determination and quantification. Compensating for stray light is very important especially in cases where a relatively-high level of HIL may be present which may impede light transmission through the specimen 212, such that the received signal strength at the image capture device 440 is of a relatively-low magnitude. In this case, the stray light may be an appreciable amount of the light received at the image capture device 440.

In some embodiments, one or more stray light patch 423 may be located directly adjacent to the specimen container 102 during imaging, and can be placed as close as practical, but may be laterally or vertically within at least about 30 mm from the serum or plasma portion 212SP in the specimen container 102 in some embodiments, and in some embodiments between about 1 mm to about 30 mm from the serum or plasma portion 212SP. Other spacing is possible. The one or more stray light patch(es) 423 should be provided at a location that can be imaged by the image capture device 440, i.e., is located within the view window 449 (shown dotted) of the image capture device 440. The one or more stray light patches 423 may contain an exposed patch area of at least 1 mm$^2$ that can be imaged. Other exposed patch areas are possible.

In particular, a stray light patch(es) 423 may be provided on a side of one or more tines 122T and may be provided at a height location that has been determined to be adjacent to a height within the specimen container 102 that will contain serum or plasma portion 212SP thereat. The height location may be determined based upon information on the historical number and size of specimen containers 102 that are expected to be received at the quality check module 130 and historical information on relative amounts of serum and plasma portion 212SP and settled blood portion 212SB present. In some embodiments, a plurality of stray light patches 423 may be provided on the carrier 122 at locations within the view window 449.

In one alternate embodiment, one or more stray light patches 423E may be provided on a thinner end of a tine 122T, either optionally or in addition to the one or more stray light patch(es) 423 provided on a side of any tine 122T that is capable of being imaged by the image capture device 440. Even though possibly smaller than the side-applied stray light patch(es) 423, this location can be made very close and even centered laterally relative to the view window 449 relative to the serum or plasma portion 212SP, by being located on a tine 122T approximately centered in the view window 449 and on the serum or plasma portion 212S.

In another embodiment, a stray light patch 423i may be provided on a patch support 432 or other structure or component of the carrier 122 or support elements thereof. The stray light patch 423i may be of the size, shape, and color as described herein. The stray light patch 423i may be located offset to a lateral side of the carrier 122 as shown in FIG. 4D.

In another embodiment, the stray light patch 423L may be provided as part of a label 218 that is adhered or otherwise provided on the specimen container 102. For example, the stray light patch 423L may be a white-colored patch bounded by a darker outline, that may be helpful in locating the stray light patch 423L in the captured image with imaging software. In this embodiment, the specimen container would be oriented so that the stray light patch 423L is oriented on one side of the view window 449 and viewable by the image capture device 440.

In yet another embodiment, the stray light patch 423S may itself be a sticker adhered or otherwise provided onto a front surface of the specimen container 102 at a location where it can be imaged by the image capture device 440. For example, the stray light patch 423S may be provided over the area of air 216, on the cap 214, or overlapping both the area of air 216 and the cap 214. In this embodiment, the stray light patch 423S may be centered in the view window 449. In this embodiment, the specimen container 102 would be oriented so that the label 218 has a roughly equal amount of reveal on the left and right sides of the specimen container 102 and traverses around the back side of the specimen container 102 so that at least some of the serum or plasma portion 212SP is viewable from the front side. In each case, of the quality check module 130 described herein, the orientation of the specimen container 102 and carrier 122 is fixed and immovable relative to the track 121, so that a portion of the serum or plasma portion 212SP is viewable by the image capture device 440. The orientation may be set manually by an operator placing the specimen container in a viewable orientation in the holder 122H. Optionally, a robot may pick up a specimen container 102 from a rack 104 (FIG. 1) and place it on a carrier 122 in a viewable orientation. For example, the robot may rotate the specimen container 102 and image a side thereof with an imaging device to determine an area that is un-occluded by label 218, and then may place the specimen container 102 in an orientation within the holder 122H so that un-occluded area will be viewable by the image capture device 440. A suitable orientation showing the label 218 with a roughly equal reveal on each side of the specimen container 102 is shown in FIG. 4D.

The carrier 122 may include, in addition to the stray light patch 423, a data-code 425 that is machine-readable from the captured images with the imaging software. Optionally, a separate barcode reader device (not shown) may be located adjacent to the image capture device 440 and configured to read the data-code 425. The data-code 425 may be any suitable barcode such as a one-dimensional barcode (e.g., a UPC code, EAN cade, Code 39, Code 128, Interleaved 2 of 5 (ITF), code 93, Codabar, GS1 Databar, MSI Plessey, or the like) or two-dimensional barcode (e.g. QR code, datamatrix code, PDF417, AZTEC, or the like). Two-dimensional barcodes may be used to allow large amounts of data can be encoded.

The stray light patch 423 may be configured in a fixed orientation relative to the data-code 425 on the carrier 122 to enable the imaging software to readily locate the stray light patch in the captured image. In some embodiments, a center location of the stray light patch 423 may be located relative to one or more geometrical datum provided on the data-code 425, such as datum 426. Datum 426 may be a series of lines, boxes or other geometrical features. In some embodiments, the stray light patch 423 and the data-code 425 may be each provided on a single sticker that is provided on the carrier 122, such as adhered onto a tine 122T thereof.

Other means for providing the stray light patch 423 and the data-code 425 in a fixed orientation to each other on the carrier 122 may include painting or printing the data-code 425 and stray light patch 423 onto the carrier 122 using a white-colored paint. In some embodiments, the color of the tine 122T may contrast substantially with the color of the carrier 122. For example, the carrier 122 may include molded tines 122T of a black or dark-colored plastic, whereas the stray light patch 423 may be a contrasting color, such as a white color. The stray light patch 423 may include a border shape, such as a square or rectangle that can be readily recognized by the imaging software. Other shapes, such as circular, triangular, octagonal, hexagonal, or other polygon shape may be used for the one or more stray light patches 423.

As is shown in FIG. 4E, the tines 122T, 122Ts may be arranged at angled orientations to each other on the carrier base 122B and also to a centerline CL. The tines may be made up of long tines 122T and short tines 122Ts. The long tines 122T, short tines 122Ts, upper spring 122S$_U$, and lower spring 122S$_L$ support and orient the specimen container 102 in an upright orientation. Upper spring 122S$_U$ and lower spring 122S$_L$ support the upper and lower portions of the specimen container 102 and bias them towards long tines 122T. Short tines 122Ts are located at the front side and back side of the specimen container 102 and prevent the specimen container 102 from tipping front to back. The short tines 122Ts are shorter in length than long tines 122T, so as not to impede imaging of the serum or plasma portion 212SP. In particular, the long times 122T may have a height dimension of between about 25 mm and about 75 mm in height from a top of the carrier base 122B to the top of the tine 122T, and the short tines 122Ts may have a height dimension of between about 5 mm and about 25 mm in height from a top of the carrier base 122B to the top of the short tine 122Ts. Other heights may be used. In some embodiments, the short tines 122Ts should be short enough in height that they do not extend above the settled blood portion 212SB, as shown in FIG. 4D. Thus, the maximum amount of the serum or plasma portion 212SP may be imaged on the front side because of being unimpeded by the short tine 122Ts on the front side and the backlighting from panel light assemblies 450 is not impeded by the short time 122Ts located on the back side.

In some embodiments, the carrier base 122B may include connection features 427, such as holes that receive pins 427P provided on, for example, a linear motor device operable to move the carrier 122 along the track 121. Optionally, the pins 427P may be part of a movable portion of the track 121. In yet other embodiments, the carrier 122 may simply rest on the track 121 and the rotational orientation of the carrier 122 on the track 121 may be maintained by track sides, which may closely abut carrier base sides 428 and prevent rotation of the carrier 122 on the track 121.

Figure 5A:
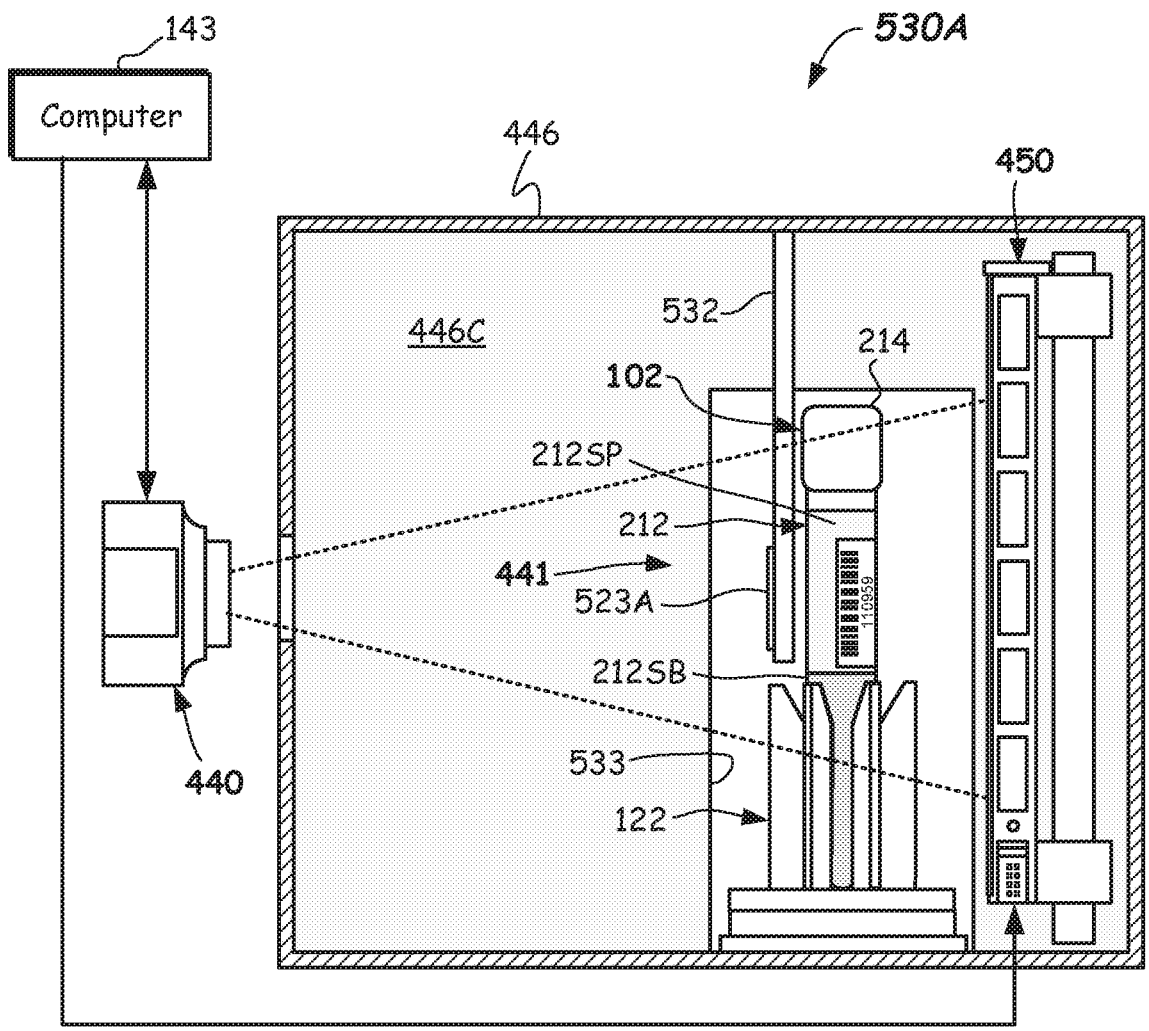
FIG. 5A illustrates a schematic side view of components of a quality check module including a stationary-mounted stray light patch according to one or more embodiments.

Now referring to FIG. 5A, another embodiment of quality check module 530A is shown and described. This embodiment is substantially identical to the embodiment described with reference to FIG. 4A-4C, except that the one or more stray light patches 523A, which may be identical in size to the stray light patch 423 described in FIGS. 4A and 4D, are provided on a stationary support 532 that is not coupled to the carrier 122 that supports the specimen container 102. For example, the stationary support 532 may be coupled to a part of the enclosure 446, as shown, or otherwise be fixed to an immovable part of the quality check module 530A. As shown, the stationary support 532 is shown coupled to a ceiling wall of the enclosure 446, but the stationary support 532 may be coupled to any suitable support structure, such as a wall, including floor wall or other structure within, or even outside of, the imaging chamber 446C. The stationary support 532 and one or more stray light patches 523A may be located so that the one or more stray light patches 523A may be positioned approximately at the vertical location of the approximate vertical center of the serum or plasma portion 212SP, based upon historical data, for example. The stationary support 532 and one or more stray light patches 523A may be located laterally to one side, such as located to the front side, for example, so that the carrier 122 and specimen container 102 may enter through door opening 533 into the imaging chamber 446C and to the imaging location 441 without interference therefrom. The one or more stray light patches 523A may be positioned in a similar manner as stray light patches 523$i$ shown in FIGS. 4D-4E, i.e., as close as possible to a side of the front side of the specimen container 102 so as to not impede imaging of the serum or plasma portion 212SP by the image capture device 440.

Figure 5B:
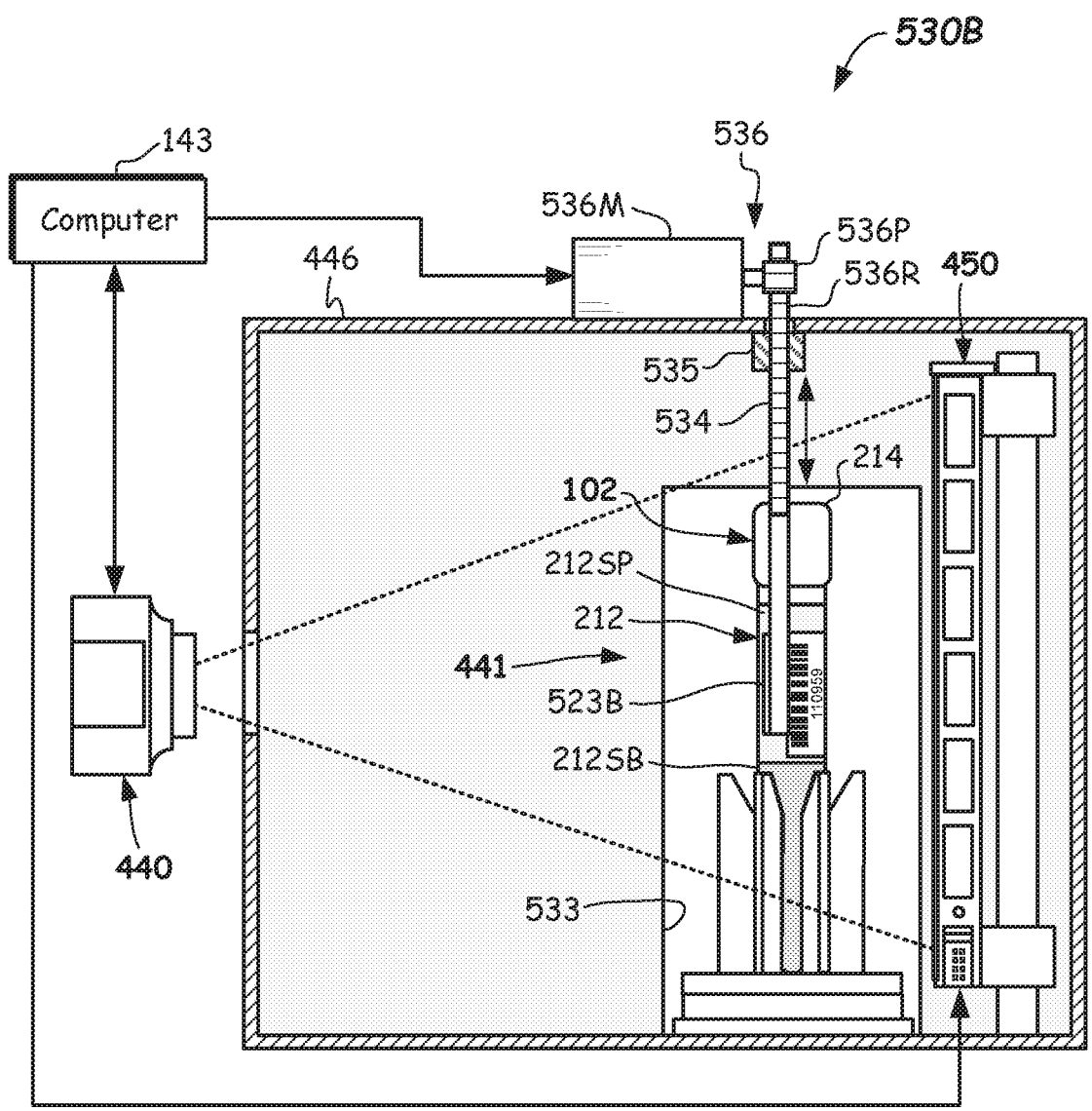
FIG. 5B illustrates a schematic side view of components of a quality check module including a moveably-mounted stray light patch according to one or more embodiments.

Now referring to FIG. 5B, another embodiment of quality check module 530B is shown and described. This embodiment is substantially identical to the embodiment described with reference to FIGS. 4A-4C, except that the one or more stray light patches 523B, which may be identical in size to the stray light patch 423 described in FIGS. 4A and 4D, are provided on a movable support 534 that is not coupled to the carrier 122 supporting the specimen container 102. For example, the movable support 534 may be movable relative to a part of the enclosure 446 and the carrier 122, as shown. The movable support 534 may be received and may operable to slide in a guide member 535 that may act as a bearing surface for the movable support 534, and may be extended and retracted by operation of a motion-producing apparatus 536. Motion-producing apparatus 536 may include, for example, a motor 536M, such as a stepper motor configured to rotationally drive a pinion 536P, which is provided in engagement with a rack 536R on or integral with the movable support 534. Rotation of the motor 536M causes rotation of the pinion 536P and retraction or extension of the movable support 534, and, thus, extension or retraction of the one or more stray light patches 523B. In this manner, the stray light patch 523B may be lowered (extended) to an optimal location within the imaging chamber 446C wherein the stray light patch 523B may be located in a path of the specimen container 102 on the track 121 as the carrier 122 enters through door opening 533 in enclosure 446, and then retracted when the carrier 122 is ready to move on the track 121 after imaging is completed. Thus, as shown, the movable support 534 is configured to move from a first location remote from the imaging location 441 to a second location adjacent to the imaging location 441 wherein imaging with the image capture device 440 takes place when the movable support 534 is located at the second location, such as when the stray light patch 523B is lowered.

Figure 6:
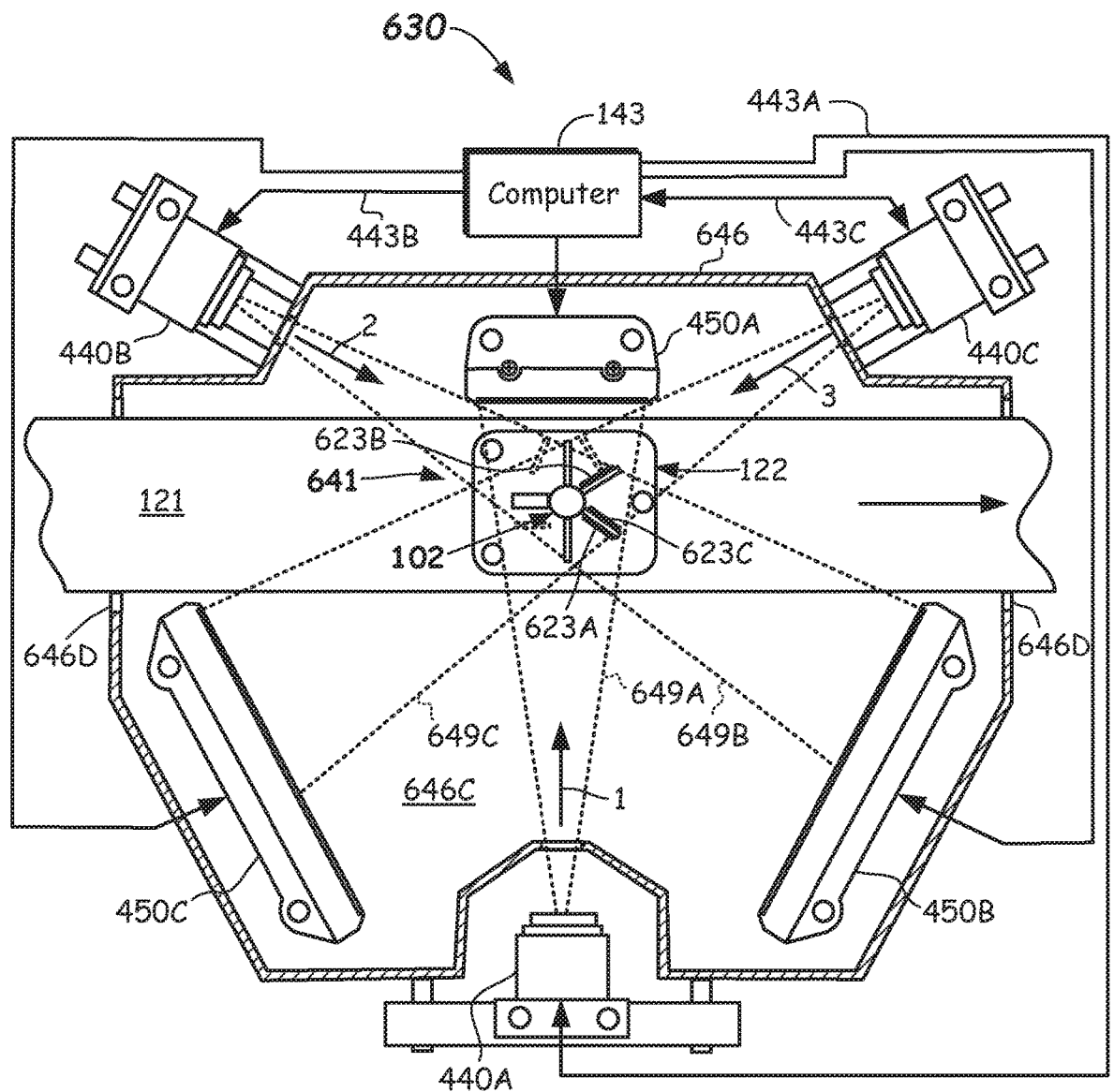
FIG. 6 illustrates a schematic top view of components of a quality check module including a plurality of image capture devices and at least one stray light patch for each viewpoint according to one or more embodiments.

Now referring to FIG. 6, another embodiment of a quality check module 630 is shown. Quality check module 630 differs from the embodiment of FIG. 4A in that multiple images of the specimen container 102 can be obtained from multiple viewpoints (e.g., viewpoints 1, 2, 3), wherein each viewpoint 1, 2, and 3, respectively, includes an image capture device 440A-440O. Each respective viewpoint 1, 2, and 3 includes a light panel assembly 450A-450O as is shown in FIG. 6. Quality check module 630 may be configured and adapted to automatically characterize and/or quantify a specimen 212 (e.g., including the serum or plasma portion 212SP, the settled blood portion 212SB, or both) and/or may additionally or optionally quantify the specimen container 102 when the specimen 212 is located at the imaging location 641. The imaging location may be for example, where the normal vectors from each of the viewpoints 1, 2, and 3 intersect, for example.

The light panel assemblies 450A-450O of the quality check module 630 may be constructed as previously described with reference to FIGS. 4B-4C and may be selectively switchable as described above. The emitting light sources of the light panel assemblies 450A-450O may emit Red (R), Green (G), Blue(B), White light, NIR, and/or IR spectra, for example. Three image capture devices 440A-440C are shown in FIG. 6, but two or more, three or more, or even four or more such devices can be used. To minimize edge distortion, three or more image capture devices 440A-440C may be used. Image capture devices 440A-440C may be conventional digital devices capable of capturing a digital image (i.e., a pixelated image) as were discussed above. For example, three image capture devices 440A, 440B, 440C may be configured to take images from multiple (e.g., three) different lateral viewpoints 1, 2, and 3 having a suitable image size as discussed above, for example. The multiple images captured may be processed by a computer 143 as will be described herein, and may in some instances, be processed by using superpixels (a collection of pixels, such as 11×11 pixels) to lower computational burden.

Each image capture device 440A-440C may be configured and operable to take multiple lateral images of at least a portion of the specimen container 102 and at least a portion of the specimen 212 (see FIG. 2-3). For example, the image capture device 440A-440O may capture a part of the specimen 212 (see FIGS. 2-3) and/or specimen container 102, including label 218, cap 214, and part of the tube 215. Eventually, from the multiple images, 2D data sets may be generated by each image capture device 440A-440C and stored in memory in the computer 143. From these 2D data sets, processing of attributes of the specimen 212 and/or the specimen container 102 can be undertaken. In each case, the image intensities of the 2D data sets may be adjusted based upon information obtained from imaging of the imaging patches 623A-623C, as will be explained further herein. As will be apparent, the computer 143 may be configured to determine a stray light compensated image (hereinafter $I_{s,comp}$) based at least upon a stray light intensity $\rho_{c,b}$ at the one or more stray light patch 423, etc.

In the embodiment shown, the plurality of image capture devices 440A-440C are shown arranged around the imaging location 441 and configured to capture lateral images from the multiple viewpoints 1, 2, and 3. The viewpoints 1, 2, and 3 may be spaced so that they are approximately equally spaced from one another, such as about 120 degrees from one another, as shown, when three image capture devices 440A, 440B, 440C are used. As depicted, the image capture devices 440A-440O may be arranged around the edges of the track 121. Other arrangements and spacing of the plurality of image capture devices 440A-440O may be used. In this way, the images of the specimen 212 in the specimen container 102 may be taken while the specimen container 102 is residing in the carrier 122. The images may overlap slightly in some embodiments.

The image capture devices 440A-440O may be provided in close proximity to and trained or focused to capture an image window, i.e., an imaging location 641 including an expected location of the specimen container 102, wherein the specimen container 102 may be stopped so that it is approximately located in a center of the view window. In operation, each image may be triggered and captured responsive to a triggering signal send by computer and provided in communication lines 443A-443C when the computer 143 receives a signal that the carrier 122 is located at the imaging location 641 in the quality check module 630. Each of the captured images may be processed according to one or more embodiments of the method including stray light compensation provided herein. In particular, HDR image processing may be used to capture and process the images in order to characterize the specimen 212 and specimen container 102 with a high level of detail and informational content.

In more detail, multiple images may be captured of the specimen 212 by the quality check module 630 at multiple different exposures (e.g., multiple exposure times) while illuminates with multiple different spectra (including different nominal wavelengths) from the different viewpoints 1, 2, and 3. For example, each image capture devices 440A-440O may take 4-8 images at different exposures times and at the multiple spectra (e.g., R, G, B).

In other embodiments, the multiple spectral images may be accomplished while being back illuminated by light from the light panel assemblies 450A-450C. The spectrally-switchable lighting source embodied as the light panel assemblies 450A-450C may back light the specimen container 102 as shown in FIG. 6 and include switchable light sources as described above. The capture and use of the multiple color images increases the information content for analysis and may emphasize certain characteristic absorption spectra when imaging at a specific spectrum.

For example, to capture images with illumination at a first spectrum, red LEDs 460 (FIG. 4C) of each of the light panel assemblies 450A-450C (nominal wavelength of about 634 nm+/−35 nm) may be used to illuminate the specimen 212 from three lateral locations. The red illumination by the light panel assemblies 450A-450C may be provided as the multiple images (e.g., 4-8 or more images) at different exposure times are captured by each image capture devices 440A-440O. In some embodiments, the exposure times may be between about 0.1 ms and 256 ms. Other exposure times may be used. Each of the respective exposure time images being illuminated with red light for each image capture devices 440A-440O may be taken and stored in memory in computer 143. At the same time, for each image, a stray light intensity is measured by imaging the stray light patches 623A-623C associated with each viewpoint 1, 2, and 3. The stray light patches 623A-623C may be located at any suitable location as described herein, such as on the carrier 122, or otherwise provided as stationary or movable locations within the imaging chamber 646C inside of the enclosure 646. For example, the stray light patches may be located at the three locations shown dotted in FIG. 6 and may be stationary like in FIG. 5A or movable like shown in FIG. 5B.

Once the red illuminated images are captured, the red LEDs 460 may be turned off and another light spectrum, for example, green LEDs 461 may be turned on (nominal wavelength of about 537 nm+/−35 nm), and multiple images (e.g., 4-8 or more images) at different exposure times may be captured at that illumination spectrum by each image capture device 440A-440C. This may be repeated with blue LEDs 462 (nominal wavelength of about 455 nm+/−35 nm) for each image capture device 440A-440C. In some embodiments, back lighting from light panel assemblies 450A-450C may be accomplished by using white light, NIR and/or IR light sources. The light panel assemblies 450A-450C may provide homogeneous light emission over the entire field of view of the image capture devices 440A-440C.

The quality check module 630 may include an enclosure 646 that may at least partially surround or cover the track 121, and the specimen container 102 may be located inside the enclosure 646 during the image taking and stray light compensation phase. Enclosure 646 may include one or more doors 646D to allow the carriers 122 to enter into and/or exit from the enclosure 646.

For each of the above setups, all of these multiple images taken at multiple exposure times for each respective spectra (e.g., R, G, B, white light, NIR, and/or IR) may be obtained in rapid succession, such that the entire collection of images for the specimen 212 from multiple viewpoints 1, 2, and 3 may be obtained in less than a few seconds, for example. Other lengths of time may be used.

As was discussed above, the back lighting from the light sources, such as light panel assemblies 450, 450A-450C may illuminate the specimen container 102 on the front side facing the respective image capture devices 440, 440A-440O not only through the specimen and specimen container 102, but also due to stray light reflected off from internal surfaces of the enclosure 446, 646 and/or from other surfaces of any other components that may be present in the imaging chamber 446C, 646C. In some cases, stray light may even originate in part from light transmitted through the specimen 212 that has been scattered and redirected to, and then reflected from surfaces of the enclosure 446, 646. Such stray light is undesired as it may affect the optical imaging and analysis. Such stray light can be particularly problematic to the analysis results for HILN if the sensed signal levels are low with respect to the emitted illumination power of the lighting source (e.g., light panel assemblies 450, 450A-450C). For example, when measuring transmittance through the specimen 212, and the specimen 212 has a low transmittance level, such as when there is a high level of lipemia, hemolysis, and/or icterus is present in the serum or plasma portion 212SP, then the low signal response may be appreciably distorted by the comparatively-high overlaid stray light signal. Accordingly, embodiments providing stray light compensation described herein allow for improved transmittance measurement of the specimen 212.

Therefore, according to embodiments, methods of stray light compensation are provided. According to a first aspect, a method of stray light calibration is provided. The stray light distribution may be locally varied. Therefore, the stray light illumination of the specimen container 102 is not expected to match the stray light intensity observed on the stray light patch 423, etc. Thus, a relationship between the estimated stray light at the stray light patch location and the stray light distribution on the specimen container 102 can be estimated by the calibration method.

The calibration method comprises imaging that ideally takes place before pre-screening imaging measurements are actually taken by the quality check module 130, 630. Thus, the calibration can be used for more than one pre-screening operation (e.g., pre-screening of multiple specimen containers 102) before a re-calibration is again performed. In some embodiments, a single calibration may be undertaken for a specific rack of specimen containers 102 containing specimens 212, for a lot of specimens 212, for a period of a day, a week, or a month, or other time interval, after a certain number of specimens 212 are pre-screened, or any other suitable calibration interval.

Figure 7A:
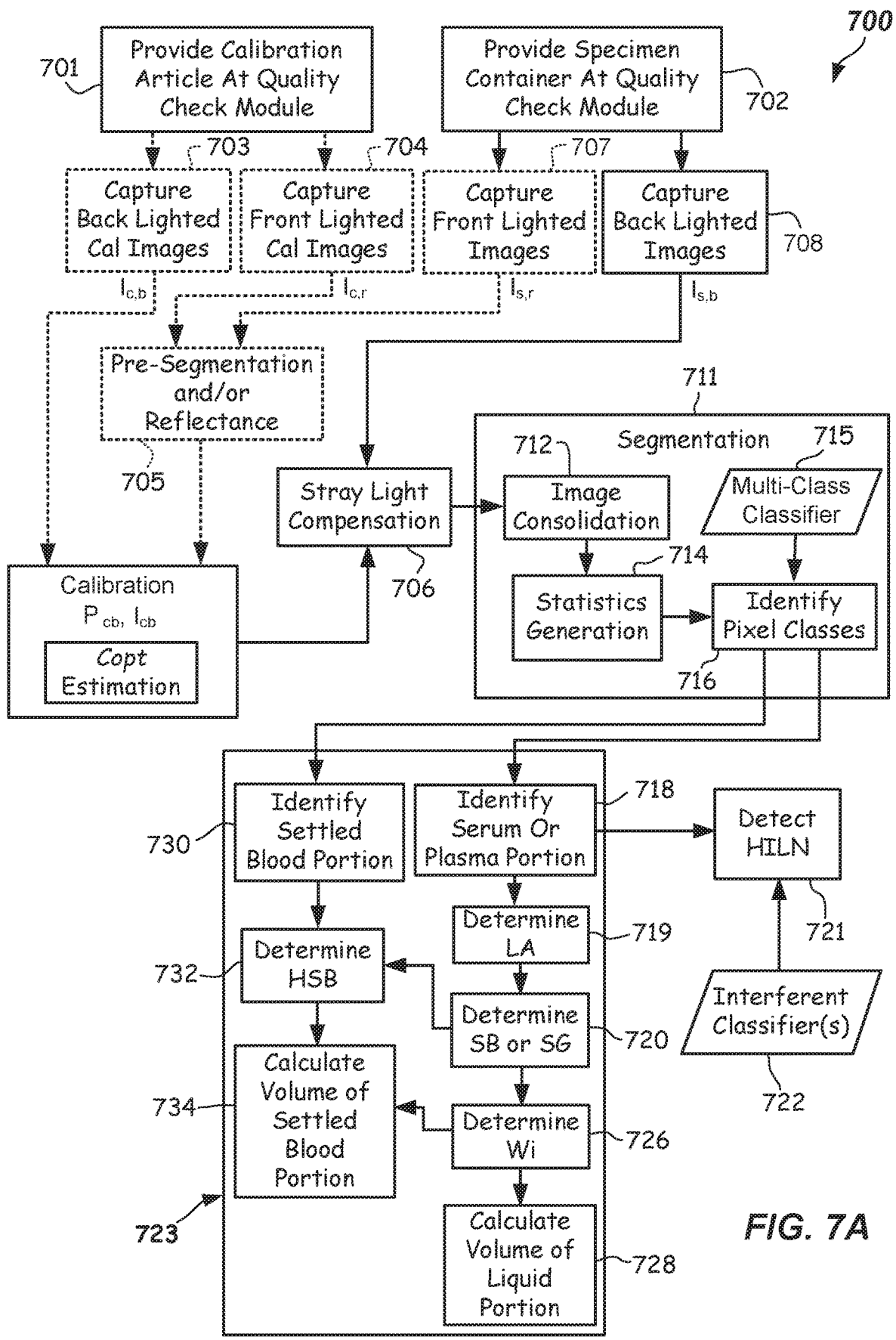
FIG. 7A illustrates a block diagram of functional components of a quality check module including stray light compensation according to one or more embodiments.
Figure 7B:
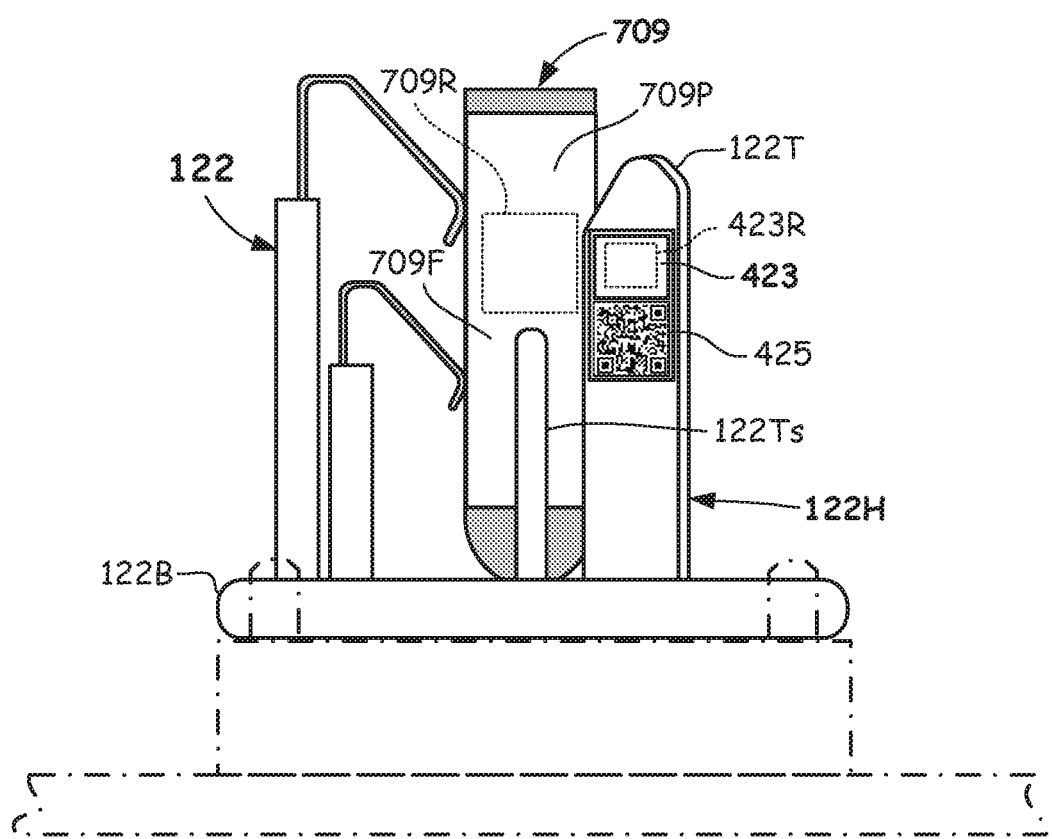
FIG. 7B illustrates a schematic side view of a specimen container carrier including one or more stray light patches and supporting a calibration object according to one or more embodiments.

The calibration method involves imaging a calibration object 709 (FIG. 7B). The calibration object may have a shape substantially similar to a specimen container 102 expected to be received at the imaging location 441, 641. Part may be painted flat black, and at least a portion 709P may be include a material (e.g., wrapped with a white paper) of a relatively diffuse reflectance characteristic, which may have a similar diffuse reflectance characteristic as the stray light patch 423. However, any suitable opaque calibration object, which may have a diffuse reflectance characteristic may be used. The calibration object 709, in one embodiment, may be opaque, and may include a portion that is dull or flat white in color. The opaque feature is designed to eliminate transmitted light passing through the calibration object 709 from reaching the image capture device 440, 440A-440C, such that only stray light reaches the image capture device 440, 440A-440C. The front side 709F of the calibration object 709 may include relatively diffuse reflective characteristics and may have a relatively-high reflective coefficient so as to minimize reflection therefrom during calibration. The calibration object 709 may be placed in the carrier 122 and located at the imaging location 441, 641 within the imaging chamber 446C, 646C during calibration. Once positioned and illuminated with a desired spectrum of light, the light distribution on the front side 709F of the calibration object 709 is recorded by imaging with the image capture devices 440, 440A-440C along with the stray light patch 423 in the view window of the capture devices 440, 440A-440C. This back lighted calibration intensity image $I_{c,b}$ may provide, in one embodiment, an image map of the spatial distribution of the stray light on the front side 709F of the calibration object 709 (side closest to the respective image capture devices 440, 440A-440C). The calibration imaging also provides a stray light patch intensity $\rho_{c,b}$.

Stray light patch intensity $\rho_{c,b}$ may be computed by measuring a range of intensity values on a sub-region 423R of one or more stray light patch 423, 623A-623C. In other embodiments, stray light patch intensity $\rho_{c,b}$ may be additionally or optionally computed by measuring the range of intensity values on a sub-region of one or more stray light patch 423E, 423L, 423S, 423i, 523A, 523B (See FIGS. 4A, 5A, and 5B). The area of the one or more stray light patch 423 etc. may be evaluated to determine, for example, a mean value, a maximum value, and/or median intensity values, any one of which may be used as a representative a scalar stray light patch intensity $\rho_{c,b}$ that is received by the stray light patch 423, etc. The location of the stray light patch 423, etc. in the image, and, thus the sub-region 423R, may be found by knowing beforehand that the stray light patch 423, etc. is located in a selected location in the view window 449, 649A-C. In other embodiments, the stray light patch 423 may be located in predefined position relative to the datacode 425 to simplify finding the location of the stray light patch 423 by image processing algorithms. Otherwise, any other suitable method may be used to locate the stray light patch 423 etc., such as finding one or more borders or an outline thereof using the contrast in color or other marking thereon.

In the case of the back lighted calibration intensity image $I_{c,b}$, in one embodiment, the map may be used to compensate the specimen image $I_{s,b}$ obtained in 708 for stray light on a pixel-by-pixel (or superpixel-by-superpixel) basis. In a simpler embodiment, the stray light compensation may capture a back lighted calibration intensity image $I_{c,b}$ and a small region 709R (shown dotted) of the front side 709F of the calibration object 709 may be averaged so that a scalar value of back lighted calibration intensity image $I_{c,b}$ may be obtained and used.

Thus, now a calibration image intensity, $I_{c,b}$ (either a matrix or scalar value) and a scalar stray light patch intensity $\rho_{c,b}$ are known, wherein c stands for calibration and b stands for back lighted illumination. Moreover, a relationship between calibration image Intensity $I_{c,b}$ and the scalar stray light patch intensity $\rho_{c,b}$ is also now known. Thus, these intensity values determined from calibration method may be used during an actual pre-screening method taking place at the quality check module 130, 530A, 530B, 630. In particular, a stray light compensated image $I_{s,comp}$ may be obtained, where s stands for specimen and comp stands for compensated.

The stray light compensated image $I_{s,comp}$ may be computed as follows:

$$I_{s,comp} = I_{s,b} - C_{opt}\{(\rho_{s,b}/\rho_{c,b})I_{c,b}\} - C_0 \qquad \text{Eqn. 1}$$

In above equation, Copt denotes an optical correction factor. The optical correction factor Copt may be a factor taking into account that the front side of the specimen container 102 may have different optical properties than the surface of calibration object 709. In the case of equal properties, and estimate of Copt=1. In a simplistic embodiment, Copt=1 may be used as one simple approximation.

In other embodiments, a more sophisticated estimation of Copt may be used. For example, a region with low reflectance (such as a settled blood portion 212SB) on the front side of the specimen container 102 may essentially absorb the stray light rather than reflecting it. Contrarily, a more highly-reflecting object on the front side, such as a label 218, may reflect a high fraction of the stray light, thus possibly distorting the transmittance measurement.

$C_0$ in the above equation is a constant map, which may take into account effects not covered by the multiplicative compensation term, such as scattering inside the specimen 212. In a typical configuration, $C_0$ may be set to zero for a suitable approximation and thus ignored. However, in some embodiments $C_0$ also may be estimated from segmentation data.

In one embodiment, the stray light compensation method and the calibration method may take into account in the estimation of Copt, features that are highly impacted by stray light on the front side, such as labels 218, serum or plasma portion 212SP, settled blood portion 212SB, gel separator 313, air 216, and the like, for example. The presence and location of such features of the specimen container may be locally determined by a pre-segmentation 705. Moreover, in some embodiments to be further explained below, their reflectance optical properties can be estimated.

One result of this pre-segmentation 705 is a map of the spatial distribution of the features (e.g., label 218, serum or plasma portion, settled blood portion 212SB, gel separator 313, air 216, or the like). Thus, in one embodiment an estimate of Copt can be assigned for each such segmented region determined to be present in the viewpoint from the results of pre-segmentation 705. In this embodiment, the computer 143 is configured and operable to determine a spatially-resolved optical correction factor Copt based upon pre-segmentation 705.

The pre-segmentation 705 may be achieved by computationally evaluating images of the specimen container 102, such as by using any suitable image processing and/or machine learning method, such as those described herein for segmentation 711. In some embodiments, pre-segmentation 705 may be performed on images captured in 707 under front lighting (e.g., using the other two light panel assemblies of FIG. 6 or by otherwise including a front lighting source in FIGS. 4A, 5A, and 5B), rather than the back lighted images, which are captured in 708 and also used to compensate for stray light.

In one embodiment, the pre-segmentation 705 may be used to generate a spatial map of assigned preset local Copt values. The assigned preset local Copt values may be previously determined and pre-stored in memory of the computer 143 for each expected segmented class type. Thus, each segment class may have a different local Copt associated therewith, which may then provide a different level of stray light compensation for each segment depending on an estimate of local reflectivity previously preset in memory. The estimates of the preset local Copt values may be based on averages from calibration specimens previously imaged.

In a more advanced case, the image of the front side of specimen container 102 can be classified into multiple cases of stray light compensation magnitude depending on what classes are determined in the captured image based upon the pre-segmentation 705, and a suitable estimated value of Copt, may be determined for each class segment based on actual measured optical reflectance properties of the front side of the specimen container 102 in that viewpoint.

Alternatively, the pre-segmentation 705 can be replaced by a direct estimation of the surface reflectance of the front side of the specimen container 102. To estimate a reflectance of the front side of the specimen container 102, an additional reflectance calibration image Ic,r in 704 and a reflectance specimen image Is,r in 707 are captured each while being front illuminated (front lighted). The reflectance calibration image Ic,r may be acquired under the same conditions (same spectrum and same exposure time) as the stray light calibration images in 703, 708, but under illumination which essentially generates reflection not arising from stray light, but only from direct illumination (see FIG. 6). For example, for viewpoint 1, the direct illumination may be accomplished using light panel assemblies 450B and 450C, wherein the reflectance specimen image Is,r is captured by image capture device 440A. During pre-screening measurement of the specimen container 102 and specimen 212, an additional reflectance specimen image $I_{s,r}$ in 707 is acquired with direct front lighted illumination. Using the reflectance calibration image Ic,r and reflectance sample image Is,r, the optical correction factor Copt can be approximated by Eqn. 2 as follows:

$$Copt \approx Is,r/Ic,r \qquad \text{Eqn. 2}$$

Copt may be a scalar value (e.g., an average) or a matrix factor to allow compensation on a pixel-by-pixel (or superpixel-by-superpixel) basis. However, the accuracy of the above approximation is limited because the specimen container 102 and specimen 212 are not opaque and, thus, internal scattering may cause some light propagation other than reflection only.

If multiple stray light conditions are to be evaluated (e.g. in case of a spectrally-switchable light source such as R, G, B light sources or other spectrally-switchable light sources) or multiple viewpoints (e.g., viewpoints 1, 2, 3), or extent of illumination (e.g., different exposures), then stray light calibration, estimation, and compensation may be performed for each such condition individually such that $I_{s,comp}$ can be determined for each condition in stray light compensation 706 using the value(s) of Copt and $I_{s,b}$ and $\rho_{s,b}$ obtained. The Copt values may preset, or may be obtained using segmentation and/or reflectance, from combinations of calibration values and measured values such as from front lighted image capture in 707 and the back lighted images captured in 708. The stray light compensated image $I_{s,comp}$ may then be determined per the equation above, and then provided to and operated on by the segmentation 711.

In case of quality check modules 630 including multiple image capture devices 440A-440C, at least one stray light sensing patch 623A-623C should be visible within the imaging window for each image capture devices 440A-440C. In some embodiments, more than one stray light sensing patch 623A-623C may be used for the viewpoints 1, 2, and/or 3. The calibration methods and stray light compensation methods may be carried out individually for each image capture device 440A-440C. According to embodiments, all images (e.g. stray light calibration images of calibration object 709 and images of specimen container 102 and specimen 212) can be acquired using high dynamic range (HDR) imaging techniques as described herein.

In some or all embodiments, images acquired under active illumination, such as by use of back illumination by light panel assembly(ies) 450, 450A-450C or even by front illumination, can be ambient light cancelled by subtraction of a respective additional image captured without such active illumination. Thus, the effects of ambient light may be removed.

The stray light calibration image kb can be computationally transformed to fit the approximate shape and location of the specimen container 102 in the carrier 122 to be measured, e.g. by computationally scaling and/or tilting the front side reflecting region of the calibration object 709.

In the case where the imaging involves multi-spectral and multi-exposure images, such as with HDR image processing, the processing of the stray light compensated image data may further involve, for example, selection of optimally-exposed pixels from the image data of the multiple captured images at the different exposure times and at each spectra, and for each image capture device 440A-440C if multiple image capture devices are used, so as to generate optimally-exposed image data for each spectra (e.g., RGB colored images) and for each image capture device 440A-440C. This is referred to as "image consolidation" herein. For each corresponding pixel, for each of the images from each viewpoint (e.g., 1, 2, and 3), pixels exhibiting optimal image intensity may be selected from each of the different exposure time images.

In one embodiment, optimal image intensity may be pixels that fall within a predetermined range (e.g., between 180-254 on a scale of 0-255), for example. Other suitable ranges may be used. If more than one pixel in the corresponding locations of two images (from one image capture device) is determined to be optimally exposed, the higher intensity of the two is selected. Each of the optimally-exposed intensity values is normalized by its respective exposure time. The result is a plurality of normalized and consolidated 2D color image data sets (e.g., R, G, B) for each viewpoint where all of the pixels are optimally exposed (e.g., one image data set per spectra (e.g., R, G, and B) and viewpoint.

Now the data, that has been stray light compensated and consolidated, may be operated on in segmentation 711 to generate one 2D consolidated image and identify a class for each pixel therein for each viewpoint. For example, the pixels may be classified as serum or plasma portion 212SP, settled blood portion 212SB, gel separator 313 (if present), air 216, tube 212T, or label 218. Cap 214 may also be classified. Classification may be based upon a multi-class classifier (e.g., multi-class classifier 715 of FIG. 7) generated from multiple training sets.

To carry out the pixel-level classification using an SVM (support vector machine), statistical data may be computed for each of the optimally-exposed pixels at the different nominal wavelengths (e.g., R, G, B) for each viewpoint to generate 2D statistical data sets in 714. The 2D statistical data sets may include mean values and covariance. Other statistics may be generated. The statistical data may include attributes up to second order for each pixel, which may include mean values, variation, and correlation values. In particular, the covariance matrix is computed over multidimensional data representing discriminative patterns Once generated, each 2D statistical data set is presented to, and operated on, by the multi-class classifier 715, which may classify the pixels in the image data sets as belonging to one of a plurality of class labels in 716, such as 1—serum or plasma portion, 2—settled blood portion, 3—gel separator (if used), 4—air, 5—tube, 6—label, and possibly even 7—cap. From this, the pixels making up the serum and plasma portion 212SP as well as the other regions may be identified. The result of the segmentation is consolidated 2D data sets, one data set for each viewpoint 1, 2, 3 where all the pixels therein are classified.

The multi-class classifier 715 may be any suitable type of supervised classification model that is linear or non-linear, such as a support vector machine (SVM) that is either linear or kernel-based, a boosting classifier such as an adaptive boosting classifier (e.g., AdaBoost, LogitBoost, or the like), an artificial neural network such as a convolutional neural network, a tree-based classifier (e.g., decision tree, random decision forests), a logistic regression as a multi-class classifier, or any other suitable multi-class classifier, for example. A SVM may be particularly effective for classification between liquids and non-liquids, such as found in the analysis of the specimen 212 and specimen container 102. A SVM is a supervised learning model with associated learning algorithms that analyzes data and recognizes patterns.

Multiple sets of training examples may be used to train the multi-class classifier 715 to segment the data sets into the desired classes, and then the image data sets are operated on and each pixel is classified as a result. The multi-class classifier 715 may be trained by graphically outlining various regions to be classified in a multitude of examples of specimen containers 102 having various specimen conditions, occlusion by label 218, levels of serum or plasma portion 212SP and settled blood portion 212SB, containing gel separator 313 or not, and the like. As many as 500 or more images may be used for training. Each training image may be outlined manually to identify and teach the multi-class classifier 715 the areas that belong to each class.

The results of the multi-class classifier 715 that have been stray light compensated and segmented, especially that are deemed to be of the class serum or plasma portion 212SP, may then be used to further quantify the specimen 212. The optimally-exposed and stray light compensated 2D data sets are then operated on by the multi-class classifier 715 to identify the pixel classes that are present in the images data sets in 716. For each pixel (or superpixel) location a statistical description is extracted. In the case of a superpixel, the description is within a small patch (e.g., a superpixel of 11×11 pixels). Each patch provides a descriptor which is considered in the evaluation process. Typically, the multi-class classifier 715 operates on the feature descriptors and provides the output classes during the evaluation. The final class for each pixel or superpixel may be determined by maximizing confidence values. The calculated statistical values encode specific properties of classes and are thus used for discrimination between different classes.

According to the method, various portions of the specimen 212 may be quantified. In a first aspect, the serum or plasma portion 212SP may be identified in 718. This may involve grouping all the pixels from the class-serum or plasma portion 212SP, and then determining a location of the upper interface between liquid (serum or plasma portion 212SP) and air 216 (i.e., LA) in 719. The upper interface LA may be determined by selection of the line of pixels that are at the uppermost extent of the identified serum or plasma portion 212SP. This may be done for each viewpoint 1, 2, and 3. A numerical value for LA may be calculated for each of the consolidated 2D image data sets by averaging the vertical locations of the uppermost pixels classified as serum or plasma portion 212SP for each viewpoint. Any substantial outliers may be rejected and not used in the average. Previous calibration between image space and coordinate space in x and z space (see FIG. 4D) may be accomplished by any known method for each viewpoint 1, 2, and 3.

Depending on whether a gel separator 313 is used in the specimen 212, the quantification method then may determine the location of SB or SG (if gel separator is present) in 720 for each viewpoint 1, 2, and 3. A numerical value for SB or SG for each viewpoint may be calculated in 720 by averaging or aggregating the locations of the lowermost pixels classified as serum or plasma portion 212SP in 716. A single value for SB or SG may be determined by averaging the SB or SG values for the viewpoints 1, 2, and 3. From the locations of LA and SB or SG, the height of the serum or plasma portion HSP (FIGS. 2 and 3) may be determined via subtraction of the averages for LA and SB or SG. These values of LA, SB or SG may be used for properly positioning a pipette tip when later aspirating the serum or plasma portion 212SP in the specimen testing apparatus 100 (FIG. 1).

Quantifying the serum or plasma portion 212SP may further include determining an inner width (Wi) of the specimen container 102 in 726. In some embodiments, the outer width (W) may first be determined by identifying the pixels that are classified by segmentation 711 as tube 215 and subtracting the locations of corresponding ones of the pixels that are located on the lateral outside edges of the tube 215 (for example, as measured between LA and SB or SG), and then averaging the subtracted values for each viewpoint 1, 2, and 3. A final value of W may be determined by averaging the W values from the viewpoints 1, 2, and 3. Substantial outliers may be ignored. Wi may be determined from W by subtracting twice the wall thickness Tw. Tw may be an average wall thickness value that has been estimated for all specimen containers 102 stored in memory, or Wi may be obtained from a lookup table based upon the tube type determined based upon the outer width W and the height HT value, which may also be determined for the specimen container 102.

From HSP and Wi, the volume of the serum or plasma portion 212SP may be determined in 728 using the relationship below in Eqn. 3.

$$VSP = HSP\{Pi/4\ Wi^2\} \qquad \text{Eqn. 3}$$

To quantify the settled blood portion 212SB, a similar method may be followed. The pixels corresponding to the class of settled blood portion 212SB may first be identified in 730. Depending on whether a gel separator 313 is present, height of the settled blood portion HSB for each viewpoint may be determined in 732 by locating the lowermost pixel of the settled blood portion 212SB in each consolidated 2D image data set and then subtracting either SB or BG. SB may be determined in 720. In the gel separator 313 is present, then BG may be determined for each viewpoint by averaging the lowermost vertical locations of pixels classified as gel separator 313. The lowermost pixel of the settled blood portion 212SB may be determined by finding the lowestmost vertical dimension of the specimen container 102 and then subtracting the wall thickness Tw for each viewpoint 1, 2, and 3. Wi may be determined in 726. A final value of HSB may be determined by averaging the respective HSB values of each of the viewpoints 1, 2, and 3. From the final value of HSB and Wi, the volume of the settled blood portion 212SB may be determined in 534 using Eqn. 4 below for the 3D model.

$$VSB=[HSB(Pi/4\ Wi^2)]-1/2\ Wi^2+(Pi/24)Wi^3 \qquad \text{Eqn. 4}$$

Once the serum or plasma portion 212SP is identified in 718, a presence of an interferent (e.g., H, I, and/or L) therein may be determined in 721 by operating on the stray light compensated 2D data sets of the serum or plasma portion 212SP with one or more interferent classifiers 722. In one embodiment, a separate classifier may be used for each of H, I, and L and even N (Normal). Optionally, the interferent classifier 721 may be a multi-class classifier. Any of the above-described trained models used for segmentation may also be appropriately trained and used for HILN detection. The training may involve imaging and data input on hundreds or even thousands of specimens 212 having various levels of HIL and N. Thus, not only can an overall determination of HILN be performed by the method, but it should also be recognized that averaged index values may also be used to provide HIL index values (Havg, Iavg, Lavg) in 721 that may be used to provide an estimate of the interferent levels for the serum or plasma portion 212SP of the specimen 212 as an average of the multiple viewpoints. Accordingly, a consistent classification may be obtained for H, I, L or N for the serum or plasma portion 212SP of the specimen 212, as well as consistent HIL index values (Havg, Iavg, Lavg).

Accordingly, it should be apparent that a model-based quantification method 700 including stray light compensation may be carried out by the quality check module 130, 430, 530A, 530B, 630 herein may result in a rapid quantification of the serum or plasma portion 212SP and/or the settled blood portion 212SB of the specimen 212. Final results and determinations can be aggregated across the multiple viewpoints and displayed as a 3D model in some embodiments.

Figure 8:
FIG. 8 illustrates flowchart of a calibration method according to one or more embodiments.
Figure 9A:
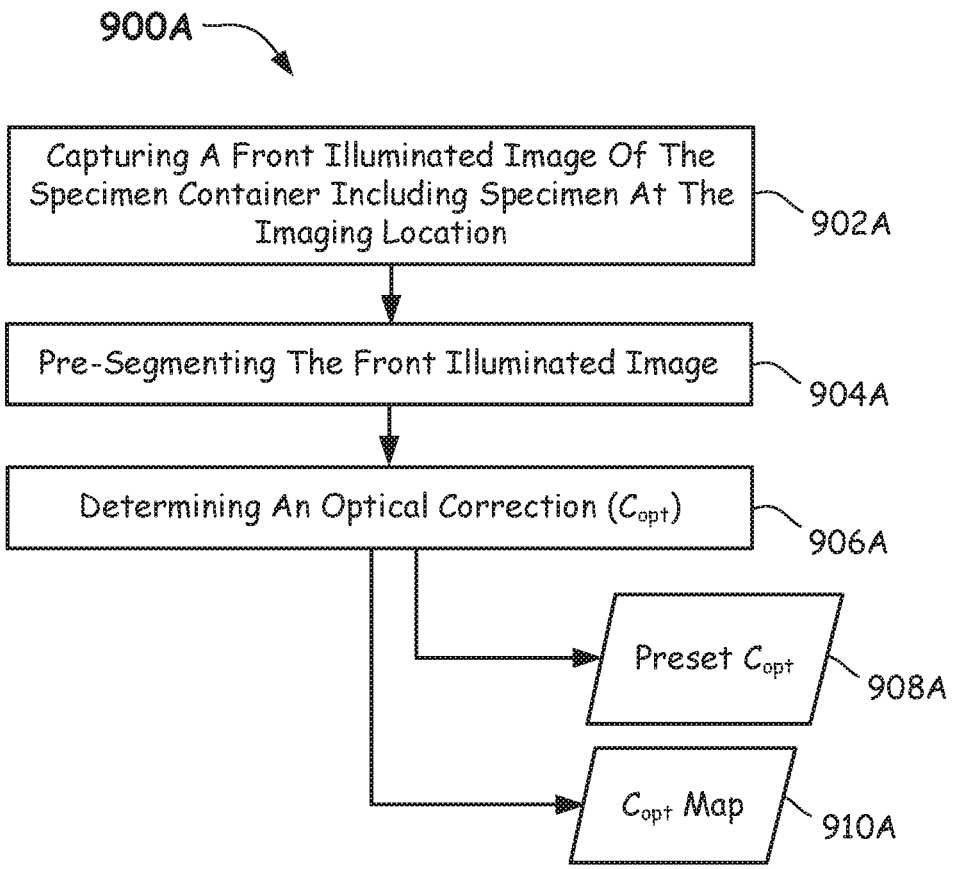
FIG. 9A illustrates a flowchart of a method of determining an optical correction factor according to one or more embodiments.
Figure 9B:
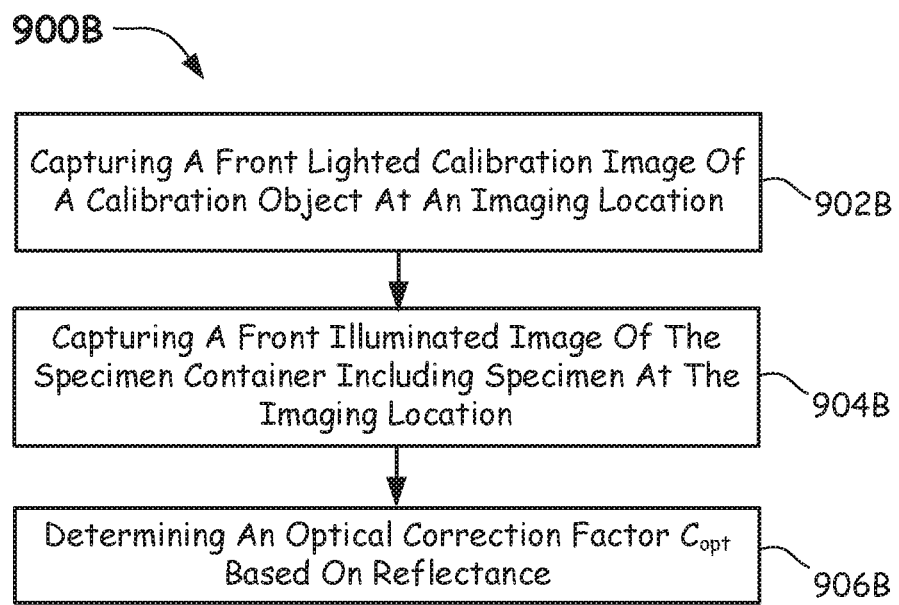
FIG. 9B is flowchart of a method of determining an optical correction factor based on reflectance according to one or more embodiments.

FIG. 8 illustrates a flowchart of a calibration method 800 operable with any one of the above quality check modules 130, 530A, 530B, 630 to provide data for the related stray light compensation method described herein and in FIG. 9. According to one or more embodiments, the calibration method 800, in 802, comprises providing an imaging location (e.g., imaging location 441, 641), an Image capture device (e.g., image capture device(s) 440, 440A-440C) on one side of the imaging location, and a backlight source (e.g., light panel assembly(ies) 450, 450A-450C) on a second side of the imaging location opposite the first side. In some embodiments front lighting sources may be provided for providing more sophisticated calibration taking into account front side reflectance, as will be apparent from the following discussion regarding FIGS. 9A and 9B.

The calibration method 800 further comprises, in 804, providing a calibration article (e.g., calibration object 709) at the imaging location (e.g., imaging location 441, 641). The calibration object 709 may be an object as described herein as being opaque, such that light from the light panel assembly 450, 450A-450C cannot pass through. The front side 709F (FIG. 7B) of the calibration object 709 may have diffuse reflection characteristics, i.e., the front side 709F may have a reflection coefficient that is relatively high. The reflection coefficient is a parameter defined by a ratio of the amplitude of the reflected wave to the incident wave. For example, a reflection coefficient that is above 75% may be used. For example, white paper the same as used for a label 218 may be used on the portion 709P of the front side 709F of the calibration object 709 that faces the respective image capture device 440, 440A-440C. Other values of reflection coefficient may be used.

The calibration method 800 further comprises, in 806, providing a stray light patch (e.g., stray light patch 423, 423E, 423i, 423L, 423S, 523A, 523B, and/or 623A-623C) at the imaging location (e.g., imaging location 441, 641). The one or more stray light patch may be located on the carrier 122, such as on a one or more tines 122T (stray light patch 423, 423E, 623A-623C) of the carrier 122, or on a patch support 432 or other component of the carrier 122 (e.g., stray light patch 423i). In other embodiments, the one or more stray light patch may be located other than on the carrier 122, such as on a stationary support 532 (e.g., stray light patch 523A) or on a movable support 534 (e.g., stray light patch 523B) not coupled to a carrier 122 supporting the specimen container 102. In the case where the quality check module 630 includes multiple viewpoints (e.g., viewpoints 1, 2, 3), a stray light patch 623A-623C may be provided within the view window for each viewpoint that can be imaged by an image capture device 440A-440C. In all instances, the stray light patches (e.g., stray light patch 423, 423E, 423i, 423L, 423S, 523A, 523B, and/or 623A-623C) should be provided in the imaging window and as close as possible to the front side of the specimen container 102 in the carrier 122 at the imaging location 441, 641.

The calibration method 800 further comprises, in 808, illuminating the imaging location (e.g., imaging location 441, 641) and the back side of calibration object 709 with the backlight source, and in 810, capturing an image with the image capture device (e.g., image capture device 440, 440A-440C) of the front side 709F of the calibration object 709 and the stray light patch (e.g., stray light patch 423, 423E, 423i, 423L, 423S, 523A, 523B, and/or 623A-623C) in the same manner and orientation and with the same type and location of stray light patch that will be used during pre-screening.

The calibration method 800 further comprises, in 812, determining a stray light intensity $\rho_{c,b}$ of the stray light patch (e.g., stray light patch 423, 423E, 423i, 423L, 423S, 523A, 523B, and/or 623A-623C) and also calibration image intensity, $I_{c,b}$ of the front side 709F of the calibration object 709. In one embodiment, the calibration image Intensity, $I_{c,b}$ may be a matrix quantity, while in another the calibration image intensity, $I_{c,b}$ may be a scalar quantity measured on a small region 709R (e.g., an average across the small region 709R). In some embodiments, the calibration method 800 may include, in 814, providing an optical correction factor Copt. Any of the methods for providing the optical correction factor Copt discussed above may be used, including assigning Copt=1, determining an average local Copt based on pre-segmentation in 705, determining an local Copt matrix based on pre-segmentation in 705 taking into account the distribution of stray light on the front face, and determining Copt based on actually optically measuring the surface reflectance.

The values of stray light intensity $\rho_{c,b}$, calibration image Intensity, $I_{c,b}$, and optical correction factor Copt determined for each condition (and viewpoint) may then be used to determine a stray light compensated images $I_{s,comp}$. Thus, it should be recognized that these values determined from calibration method 800 may be used during an actual pre-screening taking place at the quality check module 130, 530A, 530B, 630, so that a stray light compensated image $I_{s,comp}$ may be obtained. These stray light compensated image $I_{s,comp}$ may be used for segmentation 711. Moreover, they may be used for HILN detection in 721 and/or for further characterization of the specimen in specimen characterizer 723.

FIG. 9A illustrates a flowchart of a method of determining an optical correction factor Copt. The method 900A includes, in 902A, capturing an image of a front illuminated specimen container including a specimen 212 at an imaging location (e.g., imaging location 441, 641). The method 900A further includes, in 904A, pre-segmenting the front illuminated image, and then determining an optical correction factor Copt in 906A. The pre-segmenting of the front illuminated image of the specimen container (e.g., specimen container 102, such as a capped blood collection tube) containing a specimen (e.g., specimen 212) at an imaging location (e.g., imaging location 441, 641) may provide identification of segmented regions such as serum or plasma portion 212SP, settled blood portion 212SB, gel separator, air 216, and the like. The determining an optical correction factor Copt in 906A may be based on the pre-segmentation wherein in one embodiment, the output is a preset Copt for each segment in 908A in the image, or optionally may be a Copt map in 910A, i.e., a matrix of Copt values mapped to some or all of the front side of the specimen container 102. The Copt values may be stored in memory of computer 143.

As shown in FIG. 9B, another method 900B of providing Copt is shown and described. The method 900B includes, in 902B, capturing a front lighted Illuminated calibration image $I_{c,r}$ of a calibration object (e.g., calibration object 709) at an imaging location (e.g., imaging location 441, 641). The method further includes, in 904B, capturing a front lighted image of the specimen container $I_{s,r}$ (e.g., of specimen container 102) including specimen (e.g., 212) at the imaging location (e.g., imaging location 441, 641). In some embodiments, the calibration image is captured before the pre-screening. Further, the method 900B includes, in 906B, determining an optical correction factor $C_{opt}$ based on reflectance, wherein $Copt=I_{c,r}/I_{s,r}$. In this case, Copt is a matrix of values mapping the extent of the front sides of the calibration object 709 and the specimen container 102. As should be understood, Copt may be determined for each different spectra and for each viewpoint 1, 2, and 3.

Figure 10:
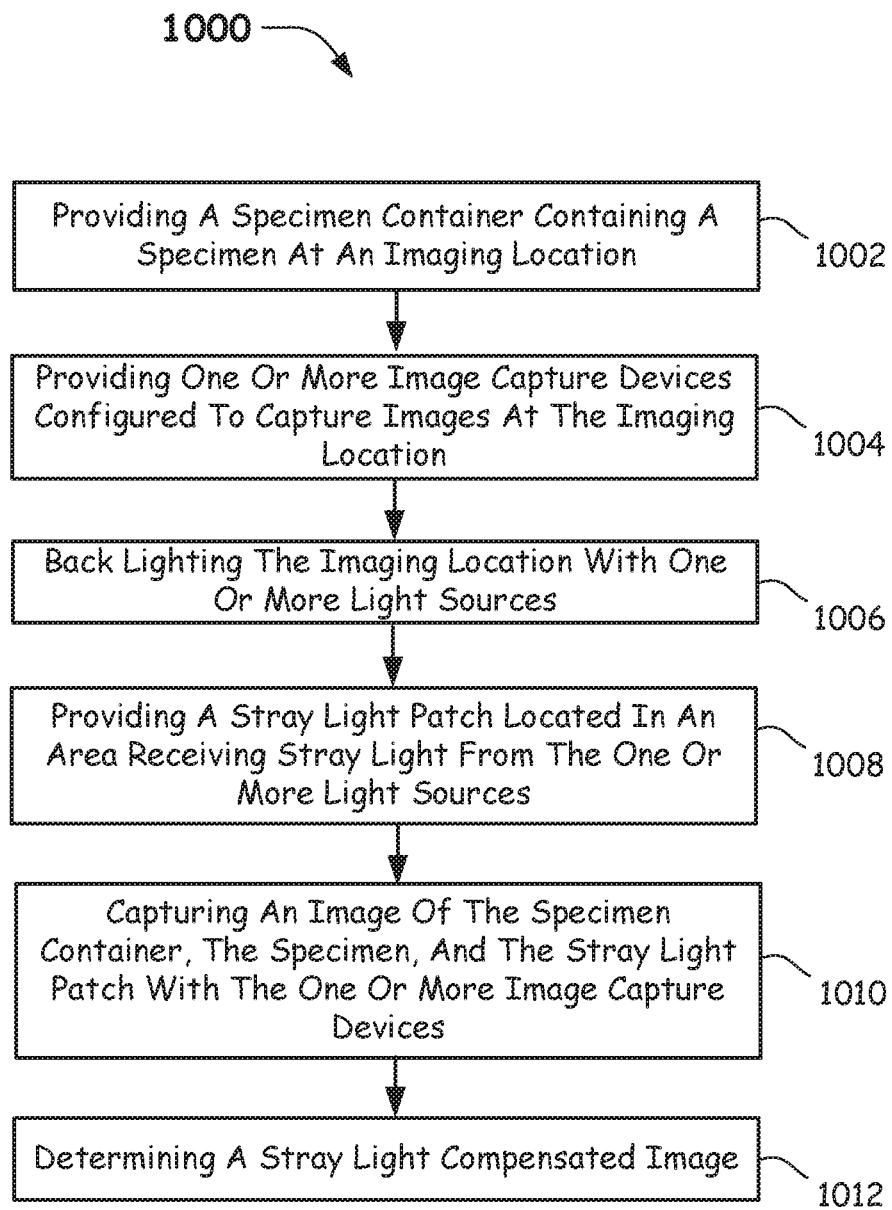
FIG. 10 is flowchart of a characterization method of determining a stray light compensated image according to one or more embodiments.

In another aspect, as is shown in FIG. 10, a characterization method 1000 may include, in 1002, providing a specimen container (e.g., specimen container 102) containing a specimen (e.g., specimen 212) at an imaging location (e.g., imaging location 441, 641).

The method 1000 further includes, in 1004, providing one or more image capture devices (e.g., image capture devices 440, 440A-440C) configured to capture images at the imaging location, and, in 1006, back lighting the imaging location with one or more light sources (e.g., light sources comprising light panel assembly(ies) 450, 450A-450C).

The method 1000 further includes, in 1008, providing a stray light patch (e.g., stray light patch 423, 423E, 423L, 423S, 423i, 523A, 523B, 623A-623C) located in an area receiving stray light from the one or more light sources, and, in 1010, capturing an image of the specimen container, the specimen, and the stray light patch with the one or more image capture devices. In 1012, the method 1000 then comprises determining a stray light compensated image (e.g., stray light compensated image $I_{s,comp}$) in accordance with Eqn. 1 above and as described herein.

While the disclosure is susceptible to various modifications and alternative forms, specific system, apparatus and method embodiments thereof have been shown by way of example in the drawings and are described in detail herein. It should be understood, however, that it is not intended to limit the disclosure to the particular system, apparatus or methods disclosed but, to the contrary, the intention is to cover all modifications, equivalents, and alternatives falling within the scope of the claims.

What is claimed is:

1. A quality check module, comprising:
an imaging location within the quality check module configured to receive a specimen container containing a specimen;
one or more image capture devices configured to capture images of the imaging location from one or more viewpoints;
one or more light sources configured to provide back lighting for the one or more image capture devices; and
one or more stray light patches located in an area receiving stray light from the one or more light sources,
wherein the one or more stray light patches are located within 30 mm of the specimen container during imaging, and
each one of the one or more stray light patches contain an exposed patch area of at least 1 mm$^2$.

2. The quality check module of claim 1, wherein the one or more light sources are spectrally-switchable between at least two light spectra.

3. The quality check module of claim 1, wherein the one or more stray light patches are provided on a carrier holding the specimen container.

4. The quality check module of claim 3, wherein the one or more stray light patches are provided on one or more tines of the carrier holding the specimen container.

5. The quality check module of claim 3, wherein the one or more stray light patches comprise a location within a view window of the one or more image capture devices.

6. The quality check module of claim 3, comprising a plurality of stray light patches provided on the carrier.

7. The quality check module of claim 3, comprising a plurality of image capture devices, and wherein the one or more stray light patches comprise at least one stray light patch within a view window of each of the plurality of image capture devices.

8. The quality check module of claim 1, comprising an enclosure forming an imaging chamber enclosing at least some of a space including the imaging location, and one or more imaging devices that reside outside of the imaging chamber.

9. The quality check module of claim 1, wherein the one or more stray light patches are provided on a stationary support not coupled to a carrier supporting the specimen container.

10. The quality check module of claim 1, wherein the one or more stray light patches are provided on a movable support that is not coupled to a carrier supporting the specimen container.

11. The quality check module of claim 10, wherein the movable support is configured to move from a first location remote from the imaging location to a second location adjacent to the imaging location wherein imaging takes place when the movable support is located at the second location.

12. The quality check module of claim 1, wherein the one or more stray light patches are provided on the specimen container, on a cap of the specimen container, or both.

13. The quality check module of claim 1, wherein the one or more stray light patches are provided on a label on the specimen container.

14. The quality check module of claim 1, wherein the one or more stray light patches are located directly adjacent to the specimen container during imaging.

15. The quality check module of claim 1, wherein one or more of the stray light patches comprise a white-colored surface.

16. The quality check module of claim 1, comprising a computer configured to determine a stray light compensated image based at least upon a stray light intensity $\rho_{c,b}$ at the one or more stray light patches.

17. A quality check module, comprising:
- an imaging location configured to receive a specimen container containing a specimen;
- an image capture device configured to capture images of the specimen container and specimen at the imaging location;
- a light source located adjacent to the imaging location and configured to provide back lighting for the image capture device;
- a stray light patch located in an area receiving stray light from the light source; and
- a computer configured to determine a stray light compensated image based at least upon a stray light intensity $\rho_{c,b}$ at the stray light patch,
- wherein the stray light patch is located within 30 mm of the specimen container during imaging, and the stray light patch contains an exposed patch area of at least 1 mm$^2$.

18. The quality check module of claim 17, wherein the computer is configured and operable to determine a spatially-resolved optical correction factor.

19. The quality check module of claim 17, wherein the computer is configured and operable to determine a calibration image Intensity, $I_{c,b}$ of a front side of a calibration object.

20. A characterization method, comprising:
- providing a specimen container containing a specimen at an imaging location;
- providing one or more image capture devices configured to capture images at the imaging location;
- back lighting the imaging location with one or more light sources;
- providing a stray light patch located in an area receiving stray light from the one or more light sources;
- capturing an image of the specimen container, the specimen, and the stray light patch with the one or more image capture devices; and
- determining a stray light compensated image,
- wherein the stray light patch is located within 30 mm of the specimen container during imaging, and
- the stray light patch contains an exposed patch area of at least 1 mm$^2$.

* * * * *